US012395913B2

(12) United States Patent
Xiong

(10) Patent No.: US 12,395,913 B2
(45) Date of Patent: Aug. 19, 2025

(54) METHOD FOR IMPLEMENTING MULTICAST BROADCAST SERVICE HANDOVER AND RELATED DEVICE

(71) Applicant: Tencent Technology (Shenzhen) Company Limited, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 368 days.

(21) Appl. No.: 17/987,789

(22) Filed: Nov. 15, 2022

(65) Prior Publication Data

US 2023/0077191 A1 Mar. 9, 2023

Related U.S. Application Data

(63) Continuation of application No. PCT/CN2022/073688, filed on Jan. 25, 2022.

(30) Foreign Application Priority Data

Feb. 10, 2021 (CN) .......................... 202110184912.9

(51) Int. Cl.
*H04W 36/26* (2009.01)
*H04W 28/02* (2009.01)
*H04W 36/00* (2009.01)

(52) U.S. Cl.
CPC ....... *H04W 36/26* (2013.01); *H04W 28/0268* (2013.01); *H04W 36/0019* (2023.05)

(58) Field of Classification Search
CPC ......... H04W 28/0268; H04W 36/0007; H04W 36/26; H04W 36/0011; H04W 36/0019;

(Continued)

(56) References Cited

U.S. PATENT DOCUMENTS

2019/0182875 A1 6/2019 Talebi Fard et al.
2020/0351980 A1 11/2020 Talebi Fard et al.
(Continued)

FOREIGN PATENT DOCUMENTS

CN 101030918 A 9/2007
CN 110557724 A 12/2019
(Continued)

OTHER PUBLICATIONS

Huawei et al., "KI1: Update of Sol. 3: Resolving Open Issue(s)", 3GPP TSG-WG SA2 Meeting #140E e-meeting, S2-2006299, Sep. 2, 2020, 19 pgs.

(Continued)

*Primary Examiner* — Nathan S Taylor
(74) *Attorney, Agent, or Firm* — Morgan, Lewis & Bockius LLP

(57) ABSTRACT

Embodiments of the present disclosure provide a method for implementing multicast broadcast service handover at a computer device acting as user equipment. The method includes: obtaining a PDU session associated with the MBS session, S-NSSAI of the PDU session being the same as S-NSSAI of the MBS session, and a DNN of the PDU session being the same as a DNN of the MBS session; obtaining an MBS session identity of the MBS session; obtaining, from an MB-SMF according to the MBS session identity, quality of service flow information corresponding to the activated MBS session; and establishing, on the PDU session according to the quality of service flow information corresponding to the activated MBS session, a quality of service flow corresponding to the activated MBS session, the quality of service flow corresponding to the activated MBS session including one or more quality of service flows.

17 Claims, 12 Drawing Sheets

(58) Field of Classification Search
CPC ..... H04W 36/08; H04W 36/165; H04W 4/06; H04W 28/02; H04W 36/00; H04W 36/16; H04L 12/18
See application file for complete search history.

(56) References Cited

U.S. PATENT DOCUMENTS

| | | | | |
|---|---|---|---|---|
| 2023/0065481 A1* | 3/2023 | Xiong | ............... | H04W 36/0011 |
| 2023/0082364 A1* | 3/2023 | Xiong | ............... | H04W 4/06 |
| | | | | 370/331 |
| 2023/0083175 A1* | 3/2023 | Xiong | ............... | H04W 4/06 |
| | | | | 370/312 |
| 2023/0309189 A1* | 9/2023 | Ronneke et al. | ....... | H04W 4/06 |
| 2023/0319514 A1* | 10/2023 | Kim | ............... | H04W 4/08 |
| | | | | 370/312 |
| 2023/0319649 A1* | 10/2023 | Zhu | ............... | H04W 36/0016 |
| | | | | 370/312 |
| 2023/0345310 A1* | 10/2023 | Li | ............... | H04W 4/06 |
| 2023/0362740 A1* | 11/2023 | Schliwa-Bertling | ............... | H04W 36/0016 |
| 2024/0172175 A1* | 5/2024 | Li | ............... | H04L 12/189 |

FOREIGN PATENT DOCUMENTS

| | | |
|---|---|---|
| CN | 111771393 A | 10/2020 |
| CN | 111866975 A | 10/2020 |
| CN | 112954614 A | 6/2021 |

OTHER PUBLICATIONS

Tencent Technology, ISR, PCT/CN2022/073688, Apr. 14, 2022, 2 pgs.
Tencent Technology, WO, PCT/CN2022/073688, Apr. 14, 2022, 5 pgs.
Tencent Technology, IPRP, PCT/CN2022/073688, Aug. 15, 2023, 6 pgs.

* cited by examiner

METHOD FOR IMPLEMENTING MULTICAST BROADCAST SERVICE HANDOVER AND RELATED DEVICE

CROSS-REFERENCE TO RELATED APPLICATIONS

This application is a continuation application of PCT Patent Application No. PCT/CN2022/073688, entitled "THE METHOD AND RELATED EQUIPMENT USED TO REALIZE THE SWITCHING OF MULTICAST BROADCAST SERVICES" filed on Jan. 25, 2022, which claims priority to Chinese Patent Application No. 202110184912.9, filed with the State Intellectual Property Office of the People's Republic of China on Feb. 10, 2021, and entitled "METHOD FOR IMPLEMENTING MULTICAST BROADCAST SERVICE HANDOVER AND RELATED DEVICE", all of which are incorporated herein by reference in their entirety.

FIELD OF THE TECHNOLOGY

The present disclosure relates to the field of communication technologies, and in particular, to a method for implementing multicast broadcast service handover, a session management function device, a multicast broadcast session management function device, a computer-readable storage medium, and a computer program product.

BACKGROUND OF THE DISCLOSURE

Unicast is one-to-one communication, and a unicast source transmits a plurality of copies of different content to different user equipment (UEs) through routers. For example, in FIG. 1, it is assumed that five copies of different content are respectively transmitted to UE 1, UE 2, UE 3, UE 4, and UE 5. An advantage of unicast communication lies in that different content can be transmitted to different users.

"Multicast" is to transmit the same content to a plurality of authorized user equipment. For example, a multicast source in FIG. 1 simultaneously transmits the same content to authorized UE 6, UE 7, and UE 8. The multicast mode is particularly suitable for application scenarios such as online video conferencing and online video-on-demand. In the multicast mode, data can be transmitted to all target nodes at a time, or data can be transmitted only to a specific object (authorized UEs)

Broadcast is also to transmit the same content to a plurality of user equipment, but does not involve selection of user equipment.

A problem exists in the 5th-generation (5th generation mobile network, 5th generation wireless system, or fifth-generation mobile communication technology, 5G) multicast broadcast service (MBS): In a 5G network, only some base stations may support the MBS, and the other base stations may not support the MBS service (for example, an MBS multicast service and/or an MBS broadcast service). When UE moves from a 5G base station (referred to as a source base station or a source radio access network (RAN) in the following descriptions) or cell that supports the MBS service to a 5G base station (referred to as a target base station or a target RAN in the following descriptions) or cell that does not support the MBS service, if the UE has joined the MBS service in advance, the UE needs to switch to a unicast transmission mode, and after MBS service transmission is activated, continues to transmit data corresponding to the MBS service in the unicast transmission mode, to achieve continuity of the MBS service.

SUMMARY

Embodiments of the present disclosure provide a method for implementing multicast broadcast service handover, a session management function device, a multicast broadcast session management function device, a computer-readable storage medium, and a computer program product, to achieve continuity of an MBS service in a procedure in which user equipment is handed over from a source base station that supports the MBS service to a target base station that does not support the MBS service.

An embodiment of the present disclosure provides a method for implementing multicast broadcast service handover, applied to an SMF corresponding to user equipment, a source base station accessed by the user equipment before the handover supporting an MBS, the user equipment having established an MBS session (short for a multicast session or a broadcast session, that is, a multicast or broadcast session, which may also be referred to as a multicast broadcast service session) on the source base station before the handover, a target base station accessed by the user equipment after the handover not supporting the MBS, a core network accessed by the target base station supporting the MBS, and the method including: obtaining a protocol data unit (PDU) session associated with the MBS session, single network slice selection assistance information (S-NSSAI) of the PDU session being the same as S-NSSAI of the MBS session, and a data network name (DNN) of the PDU session being the same as a DNN of the MBS session; obtaining an MBS session identity of the MBS session; obtaining, from an MB-SMF according to the MBS session identity, quality of service flow information corresponding to the activated MBS session (which may be, for example, all quality of service flow information corresponding to the activated MBS session), the quality of service flow information corresponding to the activated MBS session including one or more pieces of quality of service flow information; and establishing, on the PDU session according to the quality of service flow information corresponding to the activated MBS session, a quality of service flow corresponding to the activated MBS session, the quality of service flow corresponding to the activated MBS session including one or more quality of service flows.

An embodiment of the present disclosure provides a session management function device, including: one or more processors; and a storage apparatus, configured to store one or more programs, the one or more programs, when executed by the one or more processors, causing the one or more processors to implement the method according to the foregoing embodiments.

An embodiment of the present disclosure provides a method for implementing multicast broadcast service handover, performed by a computer device acting as user equipment, a source base station accessed by the user equipment before the handover supporting an MBS, the user equipment having established an MBS session with the source base station before the handover, a target base station accessed by the user equipment after the handover not supporting the MBS, a core network accessed by the target base station supporting the MBS. The method includes: after the user equipment is handed over from the source base station to the target base station, transmitting quality of service flow information corresponding to the activated MBS session (which may be, for example, all quality of service flow information corresponding to the activated MBS session) to the SMF, the quality of service flow information corresponding to the activated MBS session including one or more pieces of quality of service flow information, so that the SMF establishes, on a PDU session associated with the MBS session according to the quality of service flow information corresponding to the activated MBS session, a quality of service flow corresponding to the activated MBS session, the quality of service flow corresponding to the activated MBS session including one or more quality of service flows; and S-NSSAI of the PDU session being the same as S-NSSAI of the MBS session, and a DNN of the PDU session being the same as a DNN of the MBS session.

An embodiment of the present disclosure provides a computer device acting as a multicast broadcast session management function device, including: one or more processors; and a storage apparatus, configured to store one or more programs, the one or more programs, when executed by the one or more processors, causing the computer device to implement the method according to the foregoing embodiments.

An embodiment of the present disclosure provides a non-transitory computer-readable storage medium, storing a computer program, the computer program, when executed by a processor of a computer device acting as a multicast broadcast session management function device, causing the computer device to implement the method according to the foregoing embodiments.

An embodiment of the present disclosure provides a computer program product or a computer program, including computer instructions, the computer instructions being stored in a non-transitory computer-readable storage medium. A processor of a computer device reading the computer instructions from the computer-readable storage medium, and executing the computer instructions, causing the computer device to implement the method according to the foregoing embodiments.

In the technical solutions provided in the embodiments of the present disclosure, on the one hand, after the UE is handed over from the source base station that supports the MBS service to the target base station that does not support the MBS service, if the core network, for example, a 5G core network, accessed by the target base station supports the MBS service, the SMF may directly obtain the quality of service flow (QoS flow) information corresponding to the activated MBS session (which may be, for example, all QoS flow information corresponding to the activated MBS session) by using the MB-SMF corresponding to the MBS session, thereby simplifying a procedure of obtaining the QoS flow information of the activated MBS session by the SMF; on the other hand, this method requires slight modifications to a 5G system, so that the MBS session can be handed over to a unicast PDU session when the UE is handed over from the source base station that supports the MBS service to the target base station that does not support the MBS service, thereby achieving continuity of the MBS service.

DESCRIPTION OF EMBODIMENTS

Figure 1:
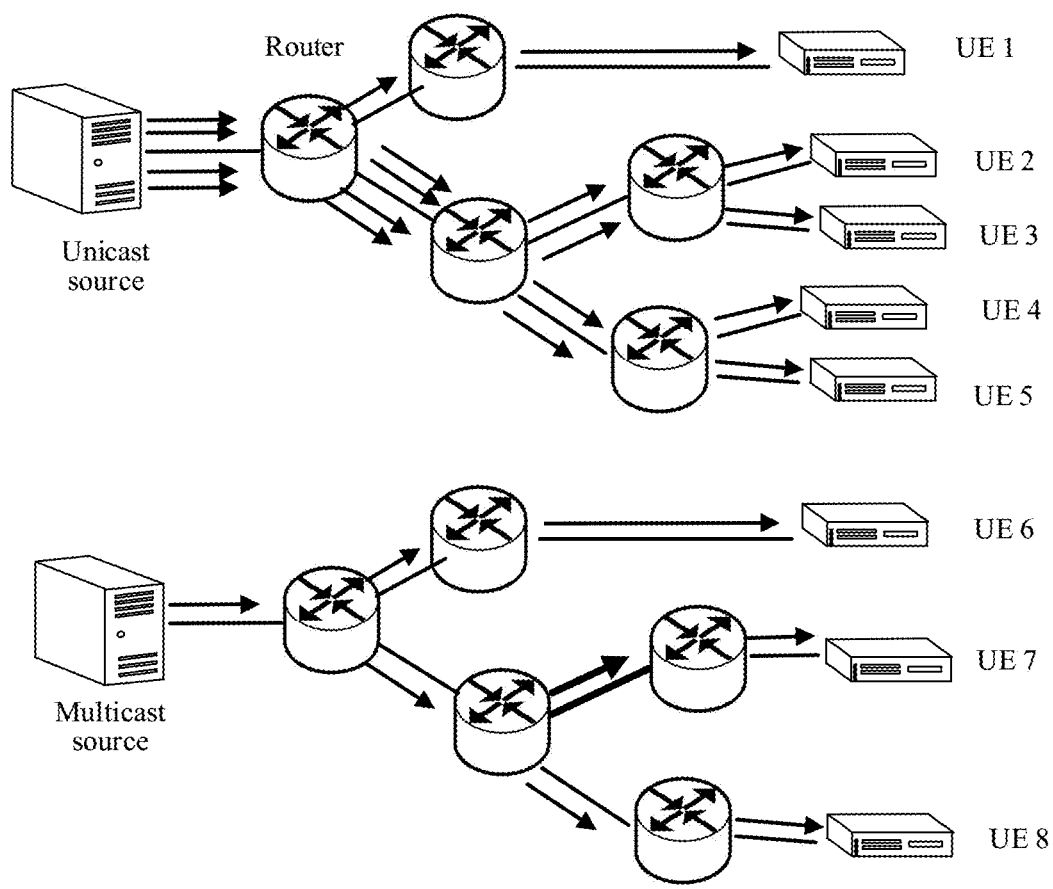
FIG. 1 is a schematic diagram of comparison between unicast and multicast IP transmission in the related art.
Figure 2:
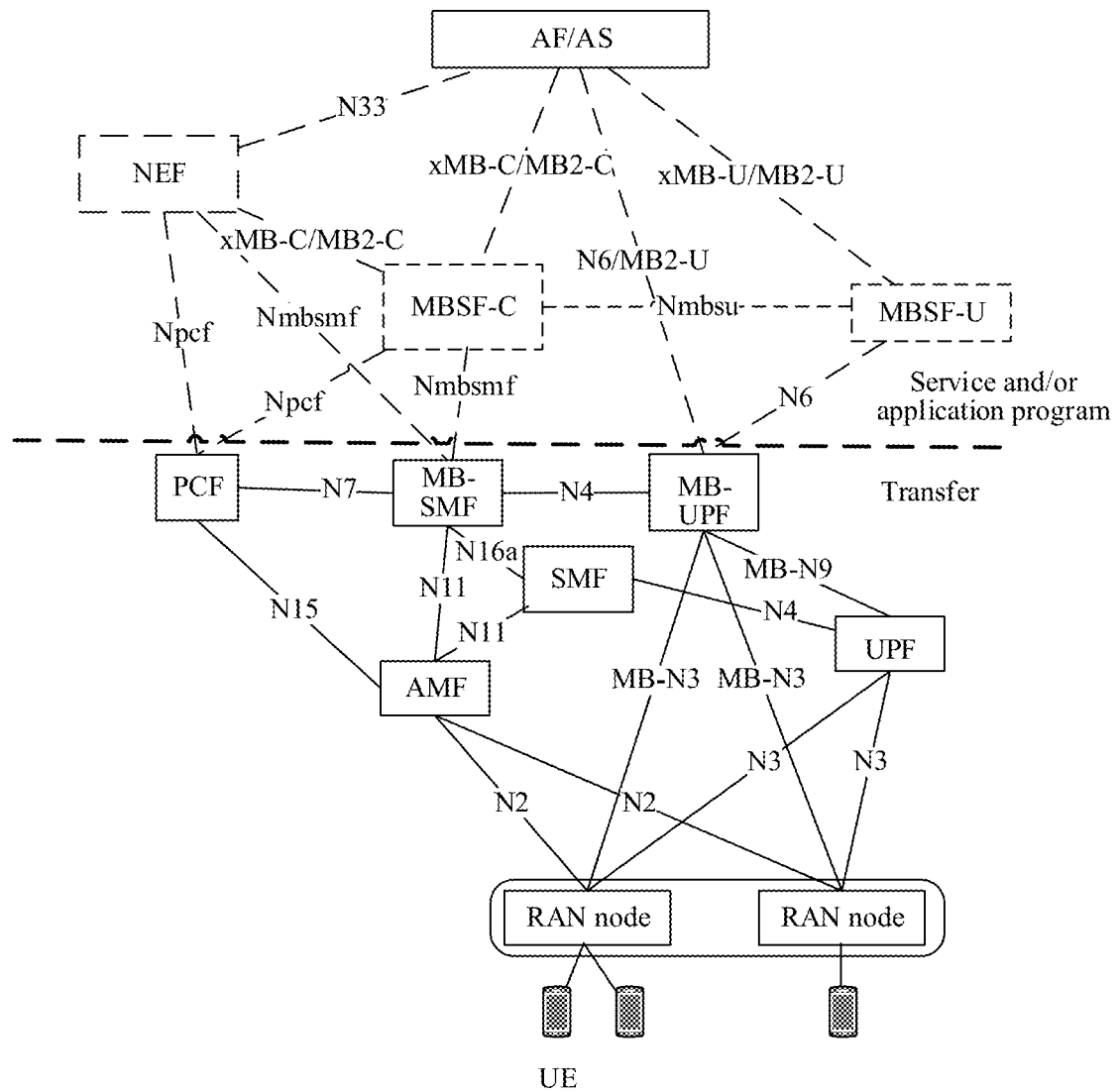
FIG. 2 is a diagram of a reference architecture of a 5G MBS in the related art.

An architecture of a 5G MBS is shown in FIG. 2. As shown in FIG. 2, a user plane function (UPF) interacts with a session management function (SMF) through an N4 interface, and receives MBS service data from a multicast broadcast UPF (MB-UPF) through a multicast broadcast N9 (MB-N9) interface, and may further transmit MBS service data to a 5G radio access network (NG-RAN, a RAN node in FIG. 2) through an N3 interface. The UPF and the MB-UPF may be logically independent, but may also share one UPF entity. The SMF may select a multicast broadcast SMF (MB-SMF) for an MBS session, and may interact with the MB-SMF to obtain information related to the MBS session. The SMF and the MB-SMF are logically independent, but may also share one entity. A unified data repository (UDR) or a network function (NR) repository function (NRF), Network Storage Function) supports MB-SMF discovery for an MBS Session, and stores an identity (ID) of a selected MB-SMF (namely, MB-SMF ID).

A multicast broadcast service function (MBSF) may include an MBSF user plane function (MBSF-U) and an MBSF control plane function (MBSF-C). The MBSF-C/U are not necessary required, but are necessary required under the following two conditions: first condition: when service interconnectivity is implemented between the 5G MBS and a 4G or 3G multimedia broadcast/multicast service (MBMS), that is, when a 5G application function (AF) and a 4G or 3G MBMS application server (AS) are the same entity, as shown in FIG. 2; or second condition: when an operator needs to perform media processing on the MBS service (for example, performing transcoding, content check, or other processing on a video).

The SMF and the UPF may participate in a procedure of a 5G MBS session, and related descriptions are provided in the following embodiments.

A full name of an NEF in FIG. 2 is network exposure function. A full name of a PCF is policy control function, where Npcf is an Npcf message for obtaining a service provided by the PCF. A full name of an AMF is access and mobility management function.

Figure 3:
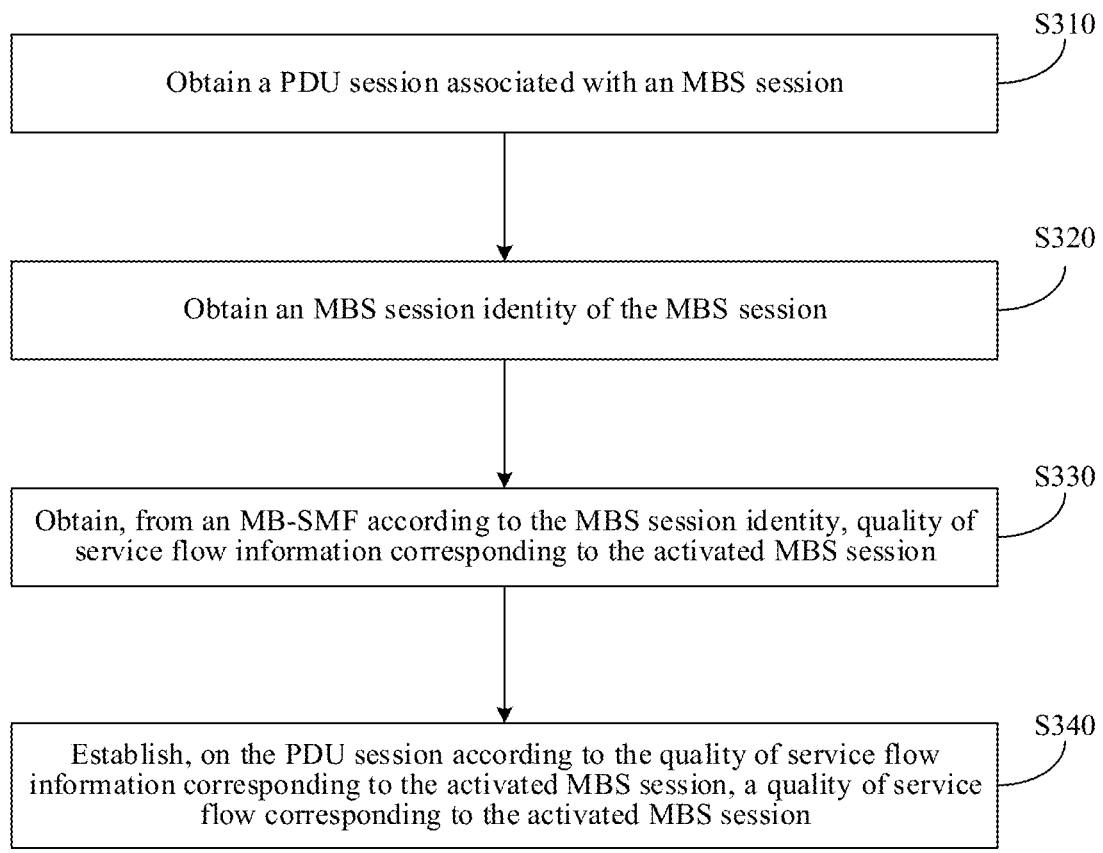
FIG. 3 is a schematic flowchart of a method for implementing multicast broadcast service handover according to an embodiment of the present disclosure.

FIG. 3 is a schematic flowchart of a method for implementing multicast broadcast service handover according to an embodiment of the present disclosure. The method provided in the embodiment of FIG. 3 may be applied to an SMF corresponding to user equipment (UE), a source base station accessed by the user equipment before the handover supporting an MBS, the user equipment having established an MBS session with the source base station before the handover, a target base station accessed by the user equipment after the handover not supporting the MBS, and a core network (in the following embodiments, a 5G core network is used as an example for description, but the present disclosure is not limited thereto) accessed by the target base station supporting the MBS.

In this embodiment of the present disclosure, a base station accessed by the UE before the handover is referred to as the source base station, and a base station accessed by the UE after the handover is referred to as the target base station. An example in which both the source base station and the target base stations are NG-RANs in a 5G system, which are respectively referred to as a source NG-RAN (or S-NG-RAN) and a target NG-RAN (or T-NG-RAN), is used for description, but the present disclosure is not limited thereto.

The MBS session in this embodiment of the present disclosure may include an MBS multicast session and/or an MBS broadcast session. It should be noted that the solution provided in this embodiment of the present disclosure is applicable to both the MBS multicast session and the MBS broadcast session. In the following exemplary descriptions, if the MBS multicast session is used as an example for description, extension may be made to an MBS broadcast session, to adaptively modify corresponding parameters and messages.

As shown in FIG. 3, the method provided in this embodiment of the present disclosure may include the following steps:

In step S310, a PDU session associated with the MBS session is obtained, S-NSSAI of the PDU session being the same as S-NSSAI of the MBS session, and a DNN of the PDU session being the same as a DNN of the MBS session.

In this embodiment of the present disclosure, the PDU session associated with the MBS session may be established on the source base station side or the target base station side, which is not limited in the present disclosure. The PDU session established on the target base station side or the source base station side is used for replacing the MBS session with the source base station, for example, an MBS multicast/broadcast session. Therefore, a combination of the S-NSSAI and the DNN of the PDU session is the same as a combination of S-NSSAI and a DNN of the original MBS multicast/broadcast session. In this way, continuity of the MBS service can be maintained.

In this embodiment of the present disclosure, if the user equipment has established a plurality of MBS sessions on the source base station before the handover, a corresponding PDU session is associated with each MBS session, S-NSSAI of each MBS session being the same as S-NSSAI of a PDU session corresponding to the MBS session, and a DNN of each MBS session being the same as a DNN of a PDU session corresponding to the MBS session.

In step S320, an MBS session identity (MBS session ID) of the MBS session is obtained.

In step S330, quality of service flow information corresponding to the activated MBS session is obtained from an MB-SMF according to the MBS session identity, the quality of service flow information corresponding to the activated MBS session including one or more pieces of quality of service flow information.

It should be noted that in this embodiment of the present disclosure, the quality of service flow information obtained by the SMF may be all quality of service flow information corresponding to the activated MBS session, and correspondingly, the quality of service flow established on the PDU session associated with the MBS session may be all quality of service flows corresponding to the activated MBS session.

In this embodiment of the present disclosure, each MBS session may be activated before or after the handover, which is not limited in the present disclosure. An action that the UE is explicitly to join the MBS but has not started service data transmission is defined as "registration", "join", or "establishment". An action that the UE starts transmission of MBS service data after joining the MBS is defined as "activation" or "service start". That is, only an MBS session with a QoS flow established is "activated", and an MBS session with no QoS flow established and with no MB-UPF is just established.

In step S340, a quality of service flow corresponding to the activated MBS session is established on the PDU session according to the quality of service flow information corresponding to the activated MBS session, the quality of service flow corresponding to the activated MBS session including one or more quality of service flows.

In an exemplary embodiment, the user equipment may have activated the MBS session with the source base station before the handover, and have not established the PDU session associated with the MBS session; the obtaining a PDU session associated with the MBS session may include: after the user equipment is handed over from the source base station to the target base station, performing a procedure, triggered by the user equipment, of establishing the PDU session on the target base station side; and the obtaining an MBS session identity of the activated MBS session may include: in the procedure of establishing the PDU session on the target base station side, receiving a PDU session establishment session management context request message from an AMF, the PDU session establishment session management context request message including the MBS session identity.

In an exemplary embodiment, the PDU session establishment session management context request message may further include the S-NSSAI, the DNN, a request type, and an N1 session management container, where the request type is indicated as Existing MBS Session, and the N1 session management container carries a PDU session establishment request.

In an exemplary embodiment, the obtaining, from an MB-SMF according to the MBS session identity, quality of service flow information corresponding to the activated MBS session may include: in the procedure of establishing the PDU session on the target base station side, transmitting a first MBS session create request message to the MB-SMF, the first MBS session create request message carrying the MBS session identity; and receiving a first MBS session create response message returned by the MB-SMF in response to the first MBS session create request message, the first MBS session create response message including the quality of service flow information corresponding to the activated MBS session.

In an exemplary embodiment, the establishing, on the PDU session according to the quality of service flow information corresponding to the activated MBS session, a quality of service flow corresponding to the activated MBS session may include: in the procedure of establishing the PDU session, transmitting a first communication N1N2 message transmission message to the AMF, so that the AMF establishes, on the DPU session according to the quality of service flow information corresponding to the activated MBS session, the quality of service flow corresponding to the MBS session.

Figure 6:
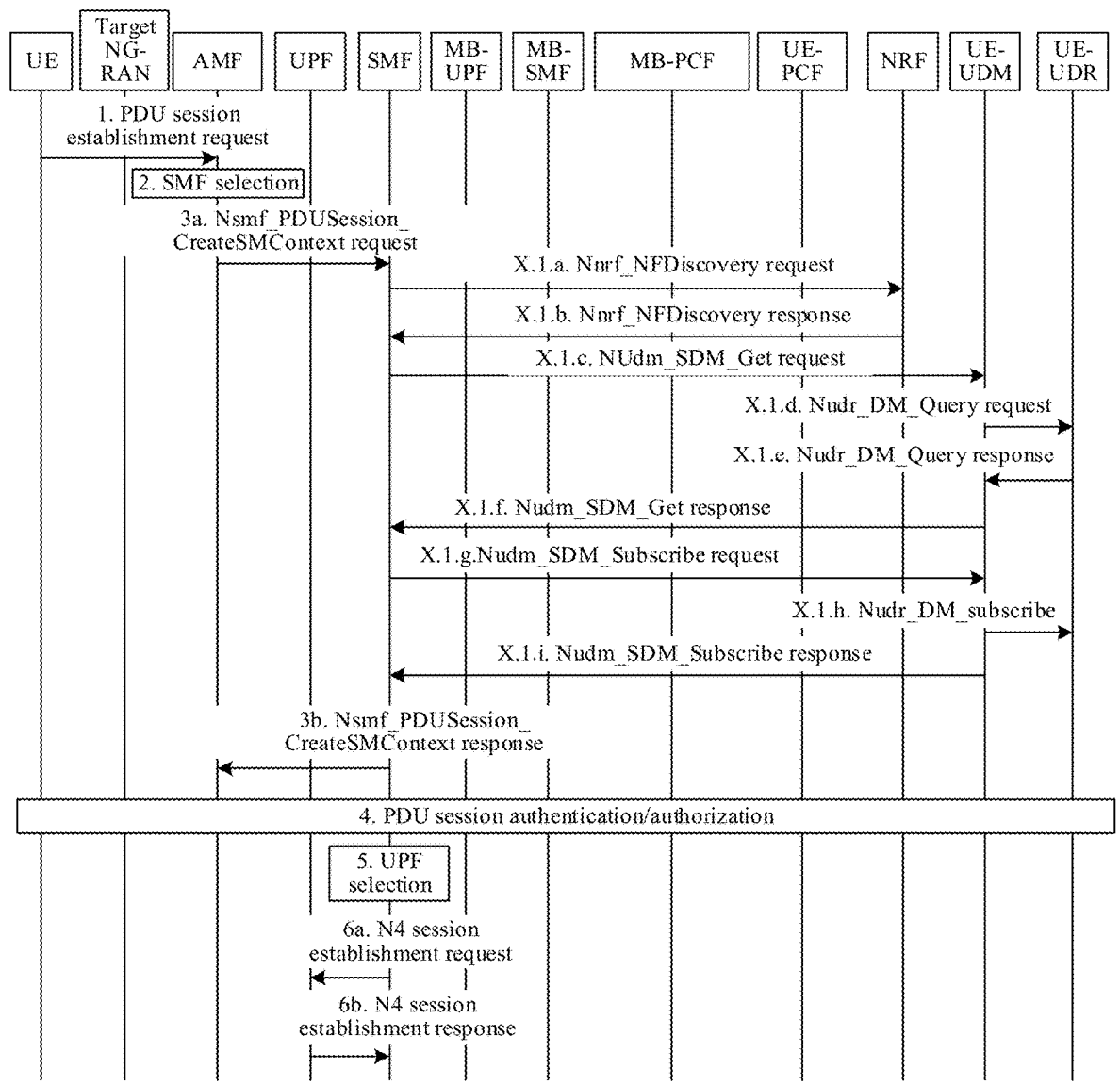
FIG. 6 is a schematic diagram of triggering a procedure of establishing a PDU session on a target NG-RAN side according to an embodiment of the present disclosure.
Figure 7:
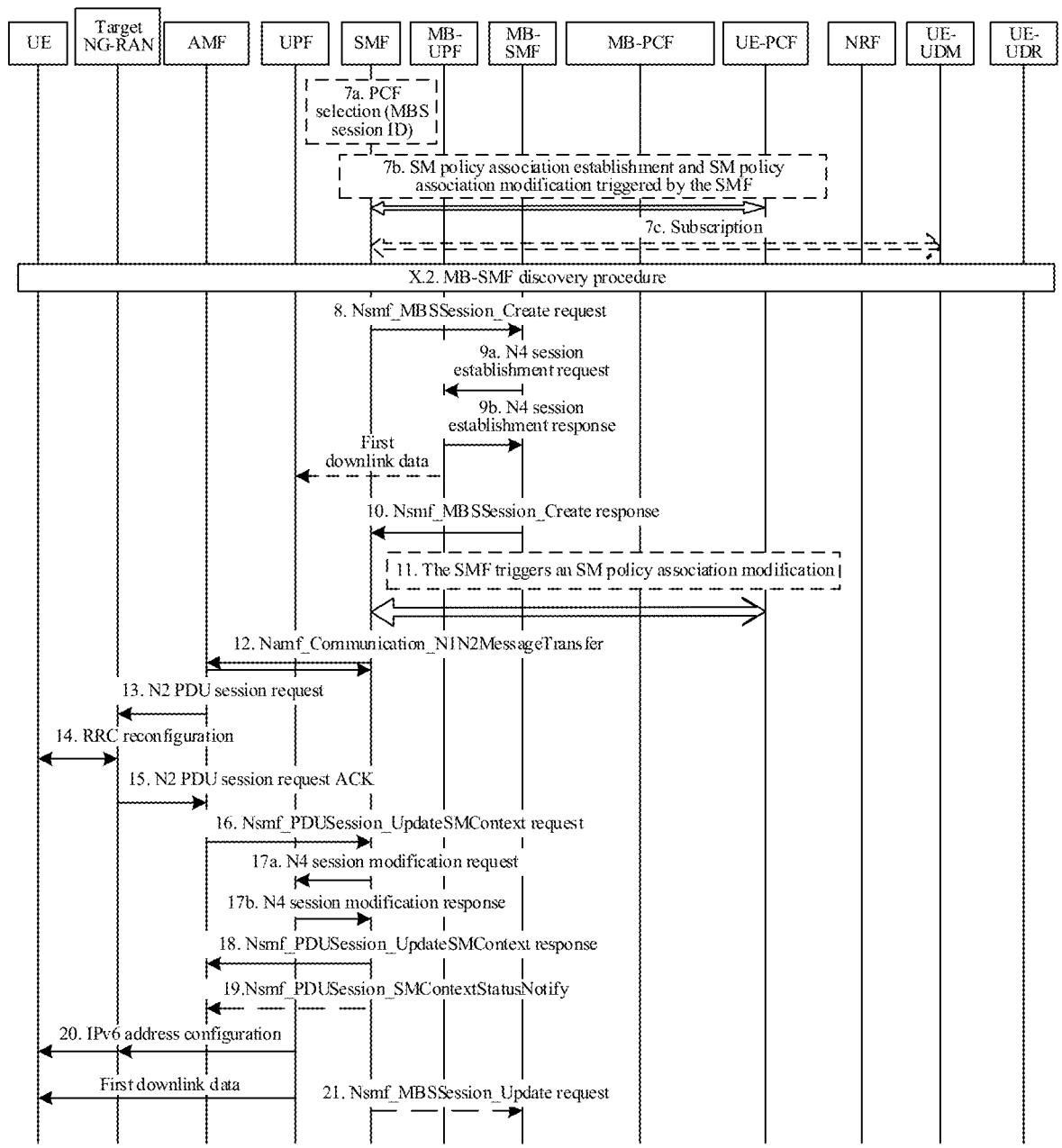
FIG. 7 is a schematic diagram of triggering a procedure of establishing a PDU session on a target NG-RAN side according to another embodiment of the present disclosure.

When the user equipment has activated the MBS session with the source base station before the handover and has not established the PDU session associated with the MBS session, for details about a procedure of establishing the PDU session on the target base station side after the handover, refer to FIG. 6 and FIG. 7.

In an exemplary embodiment, the user equipment may have not activated the MBS session with the source base station before the handover, and have not established the PDU session associated with the MBS session; before the obtaining, from an MB-SMF according to the MBS session identity, quality of service flow information corresponding to the activated MBS session, the method may further include: in a procedure of establishing the PDU session on the target base station side after the handover, transmitting a second MBS session create request message to the MB-SMF, the second MBS session create request message carrying the MBS session identity; receiving a second MBS session create response message returned by the MB-SMF in response to the second MBS session create request message; and when the second MBS session create response message does not carry the quality of service flow information corresponding to the MBS session, determining that the MBS session has not been activated.

In an exemplary embodiment, the obtaining, from an MB-SMF according to the MBS session identity, quality of service flow information corresponding to the activated MBS session may include: after the MBS session is activated, performing a procedure, triggered by the MB-SMF, of modifying the PDU session; and in the procedure of modifying the PDU session, receiving an MBS session update request message transmitted by the MB-SMF, the MBS session update request message carrying the quality of service flow information corresponding to the activated MBS session; and returning, to the MB-SMF, an MBS session update response message that responds to the MBS session update request message.

In an exemplary embodiment, the establishing, on the PDU session according to the quality of service flow information corresponding to the activated MBS session, a quality of service flow corresponding to the activated MBS session may include: in the procedure of modifying the PDU session, transmitting a second communication N1N2 message transmission message to the AMF, so that the AMF establishes, on the DPU session according to the quality of service flow information corresponding to the activated MBS session, the quality of service flow corresponding to the MBS session.

Figure 8:
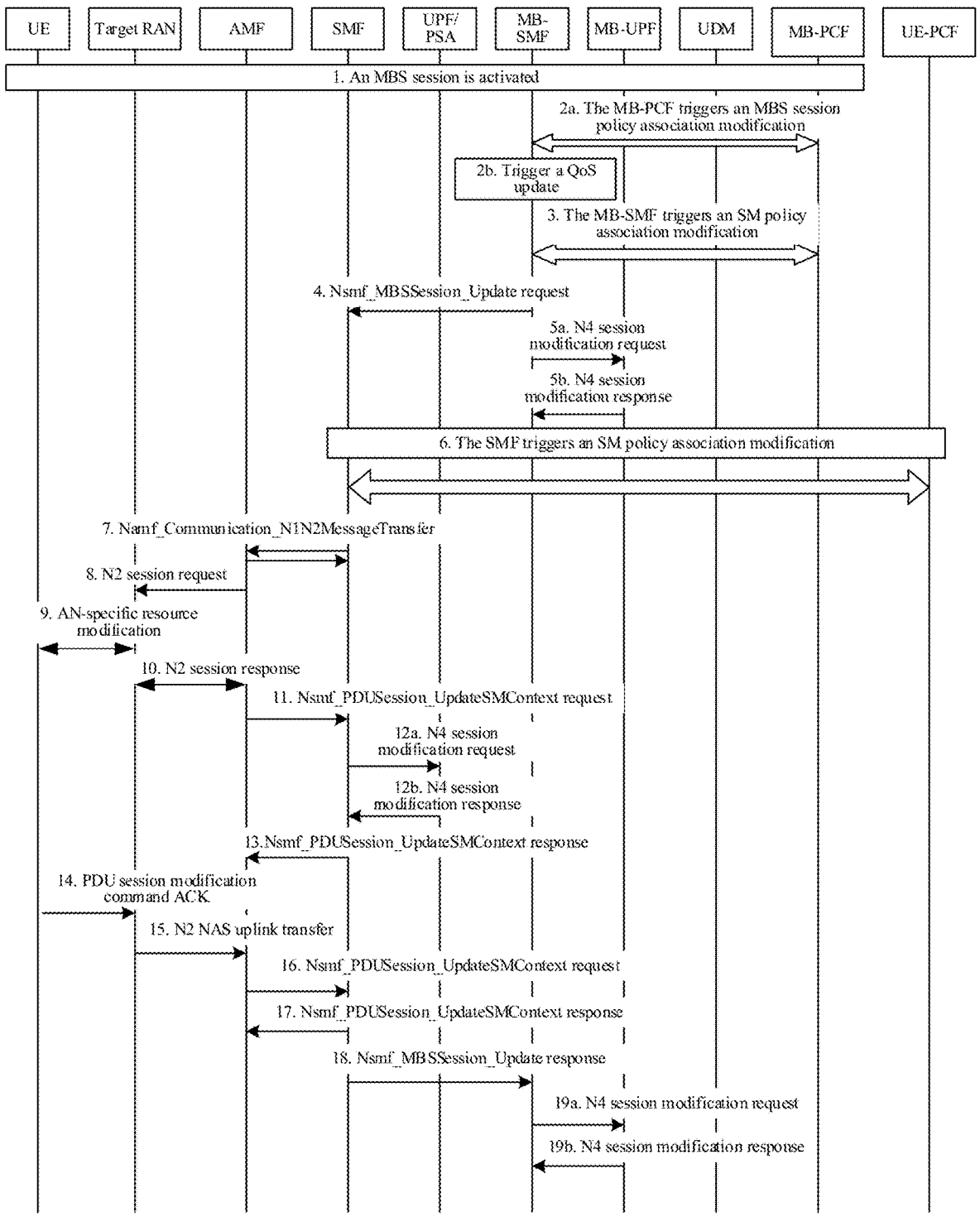
FIG. 8 is a schematic diagram of a PDU session modification procedure according to an embodiment of the present disclosure.

When the user equipment has not activated the MBS session with the source base station before the handover and has not established the PDU session associated with the MBS session, for details about a procedure of establishing the PDU session on the target base station side after the handover, refer to FIG. 6 and FIG. 7, and for details about a procedure of modifying the PDU session, refer to FIG. 8.

In an exemplary embodiment, before the obtaining, from an MB-SMF according to the MBS session identity, quality of service flow information corresponding to the activated MBS session, the method may further include: in the procedure of establishing the PDU session, determining a UE-UDM according to an SUPI of the user equipment; obtaining MBS session management subscription data of the MBS session from the UE-UDM according to the SUPI; and determining, according to the MBS session management subscription data, that the S-NSSAI and the DNN have subscribed on the UE-UDM. For details about a procedure of determining whether the S-NSSAI and the DNN have subscribed, refer to FIG. 6.

In an exemplary embodiment, after the determining, according to the MBS session management subscription data, that the S-NSSAI and the DNN have subscribed on the UE-UDM, the method may further include: transmitting a first NF discovery request message to an NRF, the first NF discovery request message carrying the MBS session identity and a network type indicated as an MBS UDM; receiving a first NF discovery request response message returned by the NRF in response to the first NF discovery request message, the first NF discovery request response message carrying an MB-UDM identity; transmitting an MBS session context get request message to an MB-UDM according to the MB-UDM identity, the MBS session context get request message carrying the MBS session identity; and receiving an MBS session context get response message returned by the MB-UDM in response to the MBS session context get request message, the MBS session context get response message carrying an MB-SMF identity of the MB-SMF corresponding to the MBS session identity. For details about a procedure of discovering the MB-SMF by the SMF, refer to FIG. 9.

In an exemplary embodiment, after the determining, according to the MBS session management subscription data, that the S-NSSAI and the DNN have subscribed on the UE-UDM, the method may further include: transmitting a second NF discovery request message to an NRF, the second NF discovery request message carrying the MBS session identity and a network type indicated as an MBS SMF; and receiving a second NF discovery request response message returned by the NRF in response to the second NF discovery request message, the second NF discovery request response message carrying an MB-SMF identity of the MB-SMF corresponding to the MBS session identity. For details about another procedure of discovering the MB-SMF by the SMF, refer to FIG. 10.

In an exemplary embodiment, the user equipment may have not activated the MBS session with the source base station before the handover, and has established the PDU session associated with the MBS session; the obtaining, from an MB-SMF according to the MBS session identity, quality of service flow information corresponding to the activated MBS session may include: after the user equipment is handed over from the source base station to the target base station and the MBS session is activated after the handover, triggering a procedure of modifying the PDU session; and in the procedure of modifying the PDU session, obtaining, from the MB-SMF according to the MBS session identity, the quality of service flow information corresponding to the activated MBS session. When the user equipment has not activated the MBS session with the source base station before the handover and has established the PDU session associated with the MBS session, for details about a procedure of implementing multicast broadcast service handover, refer to FIG. 10.

In the method for implementing multicast broadcast service handover provided in this embodiment of the present disclosure, on the one hand, after the UE is handed over from the source base station that supports the MBS service to the target base station that does not support the MBS service, if the core network, for example, a 5G core network, accessed by the target base station supports the MBS service, the SMF may directly obtain the quality of service flow (QoS flow) information of the activated MBS session by using the MB-SMF corresponding to the MBS session, thereby simplifying a procedure of obtaining the QoS flow information of the activated MBS session by the SMF; on the other hand, this method requires slight modifications to a 5G system, so that the MBS session is handed over to a unicast PDU session when the UE is handed over from the source base station that supports the MBS service to the target base station that does not support the MBS service, thereby achieving continuity of the MBS service.

Figure 4:
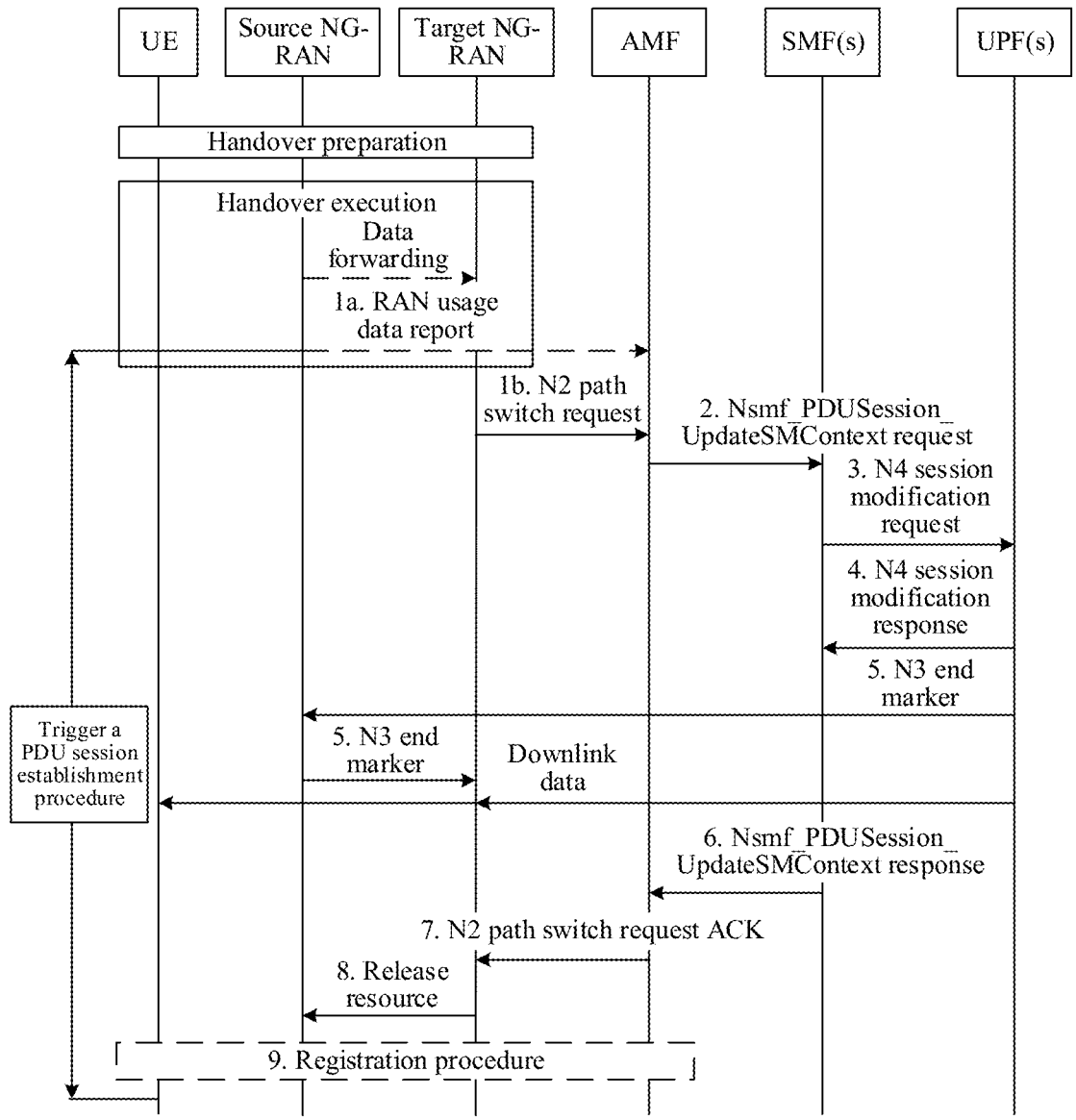
FIG. 4 is a schematic diagram of Xn based inter NG-RAN handover without UPF re-allocation according to an embodiment of the present disclosure.

There are a plurality of handover cases of a handover procedure of UE in the 3rd Generation Partnership Project (3GPP). In this embodiment of the present disclosure, two cases are described by using FIG. 4 and FIG. 5, but the method provided in this embodiment of the present disclosure is not limited to the two cases. For example, the method is further applicable to the following two cases: "Xn based inter NG-RAN handover with insertion of intermediate UPF" and "Xn based inter NG-RAN handover with intermediate UPF re-allocation". In the method provided in this embodiment of the present disclosure, a PDU session establishment procedure is added before or after a registration procedure (for example, step 9 in FIG. 4 or step 12 in FIG. 5, or even as shown in FIG. 4, there may be no registration procedure, that is, the registration procedure is optional).

A 5G radio access network mainly includes two types of nodes: gNBs and ng-eNBs. An interface between gNBs, an interface between a gNB and an ng-eNB, and an interface between an ng-eNB and a ng-eNB are all Xn interfaces. The Xn interface is a network interface between NG-RAN nodes.

In this embodiment of the present disclosure, before the UE is handed over to a target NG-RAN, if the UE has established an MBS session on a source NG-RAN side but has not activated the MBS session, that is, has not established any QoS flow, the PDU session establishment procedure may be preferentially performed after the registration procedure, but the present disclosure is not limited thereto. In this case, the PDU session establishment procedure may be alternatively performed before the registration procedure. Before the UE is handed over to the target NG-RAN, if the UE has established an MBS session on the source NG-RAN side and has activated the MBS session, that is, has established a QoS flow before the handover, the PDU session establishment procedure may be preferentially performed before the registration procedure, but the present disclosure is not limited thereto. In this case, the PDU session establishment procedure may be alternatively performed after the registration procedure.

In this embodiment of the present disclosure, if the UE has established a plurality of MBS sessions on the source base station before the UE is handed over to the target base station, assuming that some of the MBS sessions have been activated before the handover, that is, QoS flows have been established, and the other MBS sessions have not been activated before the handover, that is, QoS flows have not been established, PDU session establishment procedures corresponding to the MBS sessions activated before the handover may be preferentially performed before the registration procedure, and PDU session establishment procedures corresponding to the MBS sessions not activated before the handover may be preferentially performed after the registration procedure. In this way, an MBS session that already has service data can be preferentially switched to a PDU session, thereby increasing a service response speed and achieving timeliness of service handover. However, the present disclosure is not limited thereto. A plurality of PDU session establishment procedures corresponding to a plurality of MBS sessions may be performed in parallel and independently, with no constraint relationship between them.

FIG. 4 is a schematic diagram of Xn based inter NG-RAN handover without UPF re-allocation according to an embodiment of the present disclosure.

As shown in FIG. 4, through a handover preparation phase and a handover execution phase, the UE is handed over from the source NG-RAN to the target NG-RAN, the source NG-RAN supporting an MBS multicast/broadcast session, but the target NG-RAN not supporting the MBS multicast/broadcast session. After the UE is handed over from the source NG-RAN to the target NG-RAN, the target NG-RAN transmits a handover completion indication to the UE. After receiving the handover completion indication, the UE can learn that it has successfully accessed the target NG-RAN. After that, the UE may trigger a PDU session establishment procedure shown in FIG. 6 and FIG. 7.

In this embodiment of the present disclosure, the handover completion indication may be in any form. For example, the target base station transmits a related physical layer, media access control (MAC) layer, or radio link control (RLC) layer indication or radio resource control (RRC) layer message to the UE. A form of the handover completion indication is not limited in the present disclosure, provided that the UE can be notified that the UE has successfully accessed the target base station.

Figure 5:
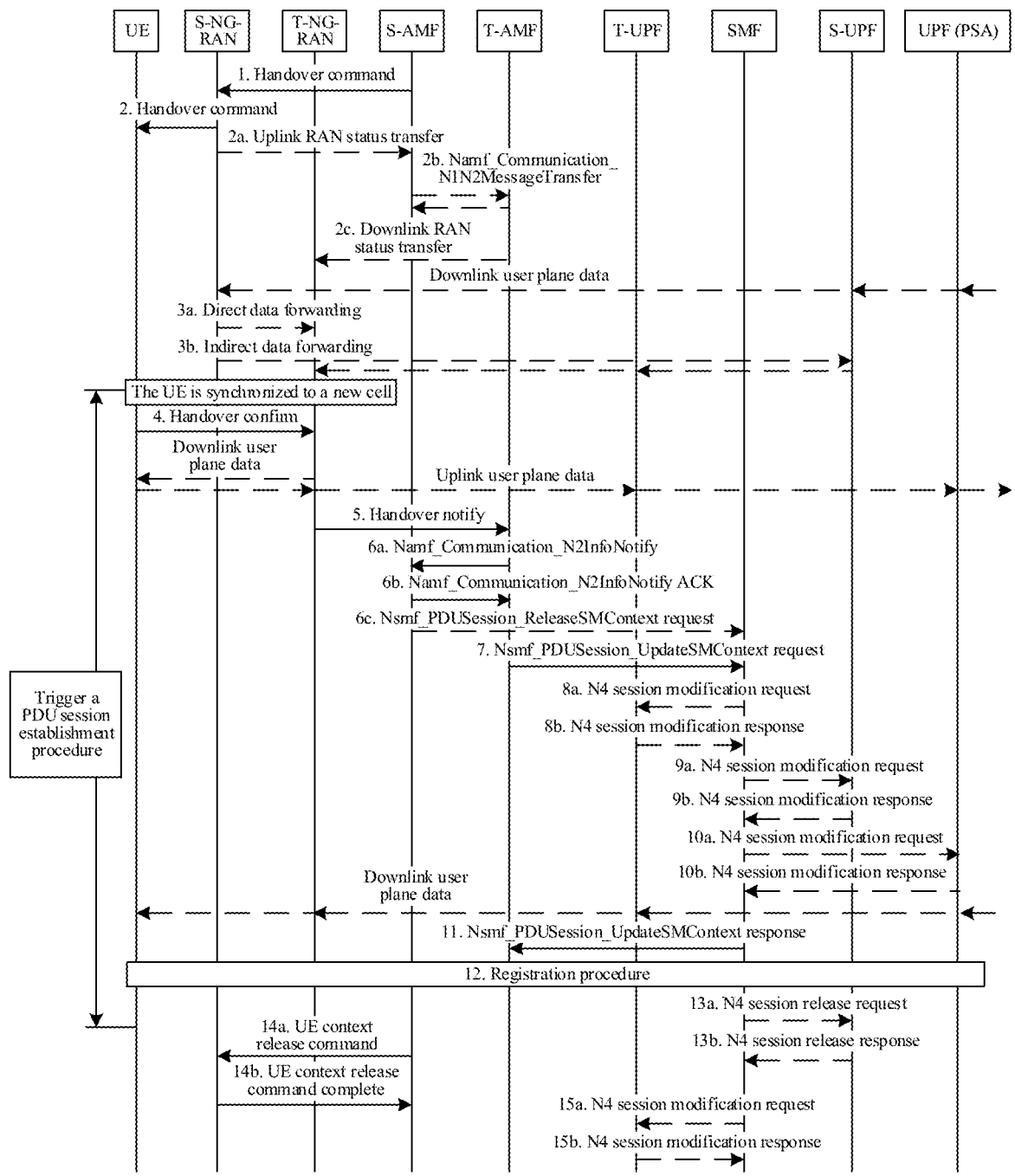
FIG. 5 is a schematic diagram of an execution phase of inter NG-RAN node N2 based handover according to an embodiment of the present disclosure.

The registration procedure of step 9 in the embodiment of FIG. 4 or step 12 in the embodiment of FIG. 5 means that after the UE receives the handover completion indication transmitted by the target base station, if the UE is handed over to a new tracking area, a registration procedure of registering the user equipment with a network is performed. The UE may trigger establishment of the PDU session on the target base station side before or after the registration procedure.

Specifically, when the UE enters a new TA due to its movement and the new TA goes beyond a current service area (registration area) (including one or more TAs) of the UE, a registration procedure of a mobility registration update type needs to be performed, so that the UE re-registers with a network, for example, a 5G system (5GS), in the new TA.

In an exemplary embodiment, when the user equipment moves from the source base station to the target base station in a connection management-IDLE (CM-IDLE) state, before triggering establishment of the PDU session on the target base station side, the UE may further trigger a service request procedure to make the user equipment enter a connection management-CONNECTED (CM-CONNECTED) state.

For example, when the UE moves, in the CM-IDLE state, from a source base station that supports the MBS multicast/broadcast session to another target base station that does not support the MBS multicast/broadcast session, the UE may enter the CM-CONNECTED state by using a service request, and then perform a PDU session establishment procedure.

In an exemplary embodiment, when the user equipment moves from the source base station to the target base station in a CM-IDLE state and a current tracking area identity (TAI) of the user equipment is not in a registered tracking area identity list (TAI List), the UE may further perform a registration procedure of a mobility registration update type before triggering establishment of the PDU session on the target base station side, so that the user equipment enters a CM-CONNECTED state.

For example, when the UE moves, in the CM-IDLE state, from a source base station that supports the MBS multicast/broadcast session to another target base station that does not support the MBS multicast/broadcast session and the UE also finds that a current TAI is not in a registered TAI list, the UE first performs a registration procedure of a mobility registration update type, and then performs a PDU session establishment procedure with a signaling connection not released.

Because the PDU session establishment procedure triggered by the UE in FIG. 6 and FIG. 7 is independent of a network-side communication procedure in FIG. 4, the UE may trigger the PDU session establishment procedure at any moment between step 1a and step 8 in FIG. 4. To be specific, a PDU session establishment procedure shown in FIG. 5 may be triggered before step 9 in FIG. 4, or the PDU session establishment procedure shown in FIG. 5 may be triggered after step 9 in FIG. 4. In addition, step 9 in FIG. 4 is optional.

The following briefly describes the steps shown in FIG. 4.

Step 1a in FIG. 4 is optional. If a public land mobile network (PLMN) has configured a secondary radio access technology (RAT) usage report, in a handover execution phase, the source NG-RAN node may provide a RAN usage data report (N2 SM Information (Secondary RAT usage data), Handover Flag, Source to Target transparent container) to the AMF. The Handover Flag indicates that the AMF needs to buffer N2 session management information (N2 SM Information) before forwarding, the N2 SM information including the usage data report. The Source to Target transparent container indicates a source-to-target transparent container.

Step 1b in FIG. 4 is optional. The target NG-RAN transmits an N2 path switch request to the AMF to notify the UE that the UE has moved to a new target cell, and provides a PDU session list for handover.

In step 2 in FIG. 4, the AMF transmits an Nsmf_PDUSession_UpdateSMContext request, namely, a PDU session update session management context request, to the SMF.

In step 3 in FIG. 4, the SMF transmits an N4 session modification request to the UPF.

In step 4 in FIG. 4, a UPF transmits an N4 session modification response to the SMF.

In step 5 in FIG. 4, to assist with a reordering function in the target NG-RAN, the UPF transmits one or more "end marker packets" for each N3 tunnel. The UPF starts to transmit downlink data to the target NG-RAN.

In step 6 in FIG. 4, the SMF transmits an Nsmf_PDUSession_UpdateSMContext response, namely, a PDU session update session management context response, to the AMF.

In step 7 in FIG. 4, the AMF transmits an N2 path switch request ACK to the target NG-RAN.

In step 8 in FIG. 4, by transmitting a resource release message to the source NG-RAN, the target NG-RAN confirms that the handover is successful. Then the target NG-RAN triggers resource release by the source NG-RAN.

The registration procedure of step 9 in FIG. 4 is optional.

FIG. 5 is a schematic diagram of an execution phase of inter NG-RAN node N2 based handover according to an embodiment of the present disclosure. Before FIG. 5, a preparation phase of inter NG-RAN node N2 based handover may be further included.

An S-NG-RAN in FIG. 5 is a source NG-RAN that supports the MBS, and may also be denoted as an S-RAN, corresponding to an S-AMF and an S-UPF. A T-NG-RAN is a target NG-RAN that does not support the MBS, and may also be denoted as a T-RAN, corresponding to a target AMF (T-AMF) and a target UPF (T-UPF). PSA in UPF (PSA) is a PDU session anchor.

In step 1 in FIG. 5, the S-AMF transmits a handover command to the S-RAN.

In step 2 in FIG. 5, the S-RAN transmits a handover command to the UE.

Step 2a in FIG. 5 is optional. The S-RAN transmits an uplink RAN status transfer message to the S-AMF.

Step 2b in FIG. 5 is optional. The S-AMF transmits a Namf_Communication_N1N2MessageTransfer service operation to the T-AMF, and the T-AMF confirms the operation.

Step 2c in FIG. 5 is optional. The S-AMF, or the T-AMF in the case of relocation of the AMF, transmits a downlink RAN status transfer message to the T-RAN.

In FIG. 5, uplink packets are transmitted from the T-RAN to the T-UPF and the UPF (PSA), and downlink packets are transmitted from the UPF (PSA) to the S-RAN through the S-UPF. The S-RAN needs to start to forward downlink data to the T-RAN. This may be implemented through direct data forwarding (step 3a in FIG. 5) or indirect data forwarding (step 3b in FIG. 5). Steps 3a and 3b in FIG. 5 are optional. The UE is synchronized to a new cell (namely, a target cell corresponding to the target base station).

In step 4 in FIG. 5, the UE transmits a handover confirm message to the T-RAN, that is, the UE indicates to the network that the UE has been handed over to the target RAN. After the UE is successfully synchronized to the target cell (target cell), the UE transmits a handover confirm message to the T-RAN. According to the handover confirm message, it is considered that the UE has been successfully handed over. After the UE has been synchronized to the new cell or the UE has confirmed that the handover is successful, the UE may trigger the PDU session establishment procedure described in the embodiment of FIG. 5 at any time, to establish the PDU session on the target base station side.

In step 5 in FIG. 5, the T-RAN transmits a handover notify message to the T-AMF.

Step 6a in FIG. 5 is optional. The T-AMF transmits Namf_Communication_N2InfoNotify to the S-AMF.

Step 6b in FIG. 5 is optional. The S-AMF transmits a Namf_Communication_N2InfoNotify ACK to the T-AMF.

Step 6c in FIG. 5 is optional. The S-AMF transmits an Nsmf_PDUSession_ReleaseSMContext request to the SMF.

In step 7 in FIG. 5, the T-AMF transmits an Nsmf_PDUSession_UpdateSMContext request to the SMF.

Step 8a in FIG. 5 is optional. The SMF transmits an N4 session modification request to the T-UPF.

Step 8b in FIG. 5 is optional. The T-UPF transmits an N4 session modification response to the SMF.

Step 9a in FIG. 5 is optional. The SMF transmits an N4 session modification request to the S-UPF.

Step 9b in FIG. 5 is optional. The S-UPF transmits an N4 session modification response to the SMF.

Step 10a in FIG. 5 is optional. The SMF transmits an N4 session modification request to the UPF (PSA).

Step 10b in FIG. 5 is optional. The UPF (PSA) transmits an N4 session modification response to the SMF.

In step 11 in FIG. 5, the SMF transmits an Nsmf_P-DUSession_UpdateSMContext response to the T-AMF.

In step 12 in FIG. 5, the UE triggers a registration procedure.

It should be noted that the UE may trigger the following PDU session establishment procedure described in FIG. 6 and FIG. 7 before or after the registration procedure in step 12 in FIG. 5.

Step 13a in FIG. 5 is optional. The SMF transmits an N4 session release request to the S-UPF.

Step 13b in FIG. 5 is optional. The S-UPF transmits an N4 session release response to the SMF.

In step 14a in FIG. 5, the AMF transmits UE Context Release Command ( ) to the S-RAN.

In step 14b in FIG. 5, the S-RAN transmits UE Context Release Command Complete ( ) to the AMF.

Step 15a in FIG. 5 is optional. The SMF transmits an N4 session modification request to the T-UPF.

Step 15b in FIG. 5 is optional. The T-UPF transmits an N4 session modification response to the SMF.

In this embodiment of the present disclosure, if no PDU session associated with an MBS session is established on the source base station side, the UE triggers establishment of a PDU session on the target base station side after determining that the target base station does not support an MBS. The determining, by the UE, that the target base station does not support an MBS may include: receiving, by the UE, a system message block broadcast by the target base station, and determining, according to the system message block, that the target base station does not support the MBS; or obtaining a target service area of the MBS, and determining, according to the target service area, that the target base station does not support the MBS.

Specifically, after the UE is handed over from a source base station that supports the MBS to a target base station that does not support the MBS, the UE may learn, by using a system information block (SIB) message broadcast by a system of a target cell corresponding to the target base station, that the target cell does not support an MBS multicast/broadcast session. For example, the SIB message broadcast by the target base station may indicate that the MBS is entirely not supported or that specific S-NSSAI, a specific DNN, or a specific combination of S-NSSAI and a DNN does not support an MBS session. In this case, the UE may determine, according to indication information of the broadcast SIB message, to establish corresponding one or more PDU sessions on the target base station. Alternatively, this may be learned in another manner. For example, whether the target base station supports an MBS multicast/broadcast session is determined according to a target service area of the MBS multicast/broadcast session. A manner of determining, by the UE, whether the target base station supports the MBS is not limited in the present disclosure.

It should be noted that in case that a plurality of MBS multicast/broadcast sessions are established and each MBS multicast/broadcast session corresponds to a combination of S-NSSAI and a DNN, the UE may determine, according to the indication information in the broadcast SIB message, to establish corresponding PDU sessions on the target NG-RAN side. The plurality of MBS multicast/broadcast sessions may be switched to their corresponding PDU sessions in parallel, or a switching sequence may be determined according to whether a service exists (that is, whether an MBS session has been activated, or whether there is a QoS flow of an MBS session).

For example, if the UE has five MBS multicast/broadcast sessions, because the target NG-RAN does not support MBS multicast/broadcast sessions, the five MBS multicast/broadcast sessions may be switched to their corresponding PDU sessions. Switching procedures of the MBS multicast/broadcast sessions may be performed independently, for example, in parallel, without a sequential relationship between them. Alternatively, some, for example, three, of the five MBS multicast/broadcast sessions that have services are handed over first, and the other, for example, two, MBS multicast/broadcast sessions without services are handed over later. This can ensure real-time handover of the MBS multicast/broadcast sessions with services and maintain service continuity.

In other embodiments, if the UE determines that the target base station after the handover also supports the MBS, an MBS session activated by the source base station may be directly switched to an MBS session of the target base station, to achieve service continuity.

In the embodiment of FIG. 6 and FIG. 7, it is assumed that a source base station accessed by the UE before the handover supports the MBS, the UE has established an MBS session with the source base station before being handed over to a target base station, the MBS session has been activated before the handover, and the UE has not established a PDU session associated with the MBS session before the handover. In addition, although the target base station after the handover does not support the MBS, a 5G core network accessed by the target base station supports the MBS. FIG. 6 and FIG. 7 are schematic diagrams of triggering a procedure of establishing a PDU session on a target NG-RAN side according to an embodiment of the present disclosure.

In step 1 in FIG. 6, the UE transmits a non-access stratum message (NAS message for short) to the AMF. The NAS message may carry a request type, the request type being indicated as Existing MBS Session, so that the AMF selects an SMF for a new PDU session according to the value of the request type.

In an exemplary embodiment, the NAS message may further carry the S-NSSAI, the DNN, and the MBS session identity of the MBS session, so that the SMF establishes the PDU session based on the S-NSSAI, the DNN, and the MBS session identity.

In an exemplary embodiment, the NAS message may further carry a PDU session identity (PDU session ID) of the PDU session and an N1 session management (SM) container, the N1 session management container carrying a PDU session establishment request.

For example, after the UE is handed over to a target base station that does not support the MBS and determines that the target base station does not support the MBS, the UE may initiate a PDU session establishment procedure to establish a PDU session on the target base station side. The UE may transmit a NAS message to the AMF, and add the following parameters to the NAS message: S-NSSAI, DNN, PDU Session ID, Request Type, MBS Session ID (which may include, for example, MBS Multicast Session/Broadcast Session ID, which may be denoted as an Old MBS Multicast/Broadcast Session ID for corresponding to the original source base station in the following descriptions), and N1 SM Container, the N1 SM Container carrying a PDU session establishment request. That is, the NAS message may be represented as NAS Message (S-NSSAI(s), UE Requested DNN, PDU Session ID, Request type, Old MBS Session ID, N1 SM container (PDU Session Establishment Request, [Port Management Information Container])).

In this embodiment of the present disclosure, the Request Type is indicated as Existing MBS Session, and the Existing MBS Session may include Existing MBS Multicast/Broadcast Session. When the AMF receives the NAS message transmitted by the UE, the Request Type being indicated as Existing MBS Multicast/Broadcast Session is treated as a new PDU session, that is, a new SMF is selected. The AMF may establish a PDU session through interaction with the SMF, and establish one or more QoS flows corresponding to the activated MBS session in the PDU session.

The Old MBS Session ID being indicated as Old MBS Multicast/Broadcast Session ID indicates an MBS multicast/broadcast identity (denoted as an MBS multicast/broadcast ID in some of the following descriptions) corresponding to an MBS multicast/broadcast session. The Old MBS Session ID being indicated as Old MBS Multicast Session ID indicates that an MBS multicast service is handed over. The Old MBS Session ID being indicated as Old MBS Broadcast Session ID indicates that an MBS broadcast service is handed over.

The N1 SM Container, namely, the N1 session management container, carries a PDU session establishment request. The Port Management Information Container indicates a port management information container.

The combination of the S-NSSAI and the DNN in the NAS message is a combination of S-NSSAI and a DNN corresponding to the Old MBS Multicast/Broadcast Session. The PDU session established on the target NG-RAN side is used for replacing an MBS multicast/broadcast session on the source NG-RAN side. A combination of S-NSSAI and a DNN of the PDU session on the target NG-RAN is the same as a combination of S-NSSAI and a DNN of the original MBS multicast/broadcast session, so that service continuity can be maintained.

It should be noted that in the foregoing example, the NAS message carrying the S-NSSAI, the DNN, the PDU Session ID, the Request Type, the MBS Session ID, and the N1 SM Container is used as an example for description, but the present disclosure is not limited therefore. In other embodiments, the UE may directly or indirectly transmit a plurality of NAS messages to the AMF, and each NAS message carries at least some of the foregoing content; or the UE may directly or indirectly transmit one or more messages in another form to the AMF, provided that the foregoing information can be passed to the AMF, to notify the AMF that a PDU session currently needs to be created, and the PDU session is used for replacing the MBS session that has been established on the source base station side but has not been activated. Specific values and expression forms of the foregoing information are not limited to the forgoing example.

In the embodiment of FIG. 6 and FIG. 7, there is an interface between the SMF and a PCF. To be specific, two PCFs may appear in FIG. 6 and FIG. 7, where one PCF is connected to the MB-SMF and is referred to as a multicast broadcast policy control function (MB-PCF), and may be configured to provide context information of an MBS multicast/broadcast session, and is used for policy control for an entire 5G MBS session; and the other PCF connected to the SMF is referred to as a user equipment policy control function (UE-PCF), and is configured to control a policy of a PDU session. The MB-PCF and the UE-PCF are logically independent, but may also be one PCF entity. The SMF and the MB-SMF are logically independent, but may also be one SMF entity. Likewise, the UPF and the MB-UPF are logically completely independent, but may be one UPF entity.

In step 2 in FIG. 6, the AMF treats the Request Type being indicated as Existing MBS Multicast/Broadcast Session as a new PDU session for processing, that is, selects a new SMF (the SMF in FIG. 6 is different from the MB-SMF). The AMF selects an SMF according to the S-NSSAI and the DNN provided by the UE.

In step 3a in FIG. 6, the AMF transmits an Nsmf_PDUSession_CreateSMContext request message (namely, a protocol data unit session establishment session management context request message, referred to as a PDU session establishment session management context request message) to the selected SMF, the Nsmf_PDUSession_CreateSMContext request message carrying DNN, S-NSSAI, Request Type, Old MBS Session ID, and N1 SM Container, that is, Nsmf_PDUSession_CreateSMContext Request (SUPI, selected DNN, UE requested DNN, S-NSSAI(s), PDU Session ID, AMF ID, Request Type (indicated as Existing MBS Multicast/Broadcast Session), Old MBS Session ID, PCF ID, Priority Access, [Small Data Rate Control Status], N1 SM Container (PDU Session Establishment Request), User location information, Access Type, RAT Type, PEI, GPSI, UE presence in LADN service area, Subscription For PDU Session Status Notification, DNN Selection Mode, Trace Requirements, Control Plane CIoT 5GS Optimisation indication, or Control Plane Only indicator).

The Nsmf_PDUSession_CreateSMContext Request carries the subscription permanent identifier (SUPI), the DNN, the S-NSSAI, the Request Type (=Existing MBS Multicast/Broadcast Session), the Old MBS Session ID (=Old MBS Multicast/Broadcast Session ID), and the like. The Priority Access indicates priority access, the Small Data Rate Control Status indicates a small data rate control status, the User location information indicates user location information, the Access Type indicates an access type, the RAT Type indicates an RAT type, the PEI is short for permanent equipment identifier, the GPSI is short for generic public subscription identifier, the UE presence in LADN service area indicates that the UE exists in a local area data network (LADN) service area, the Subscription For PDU Session Status Notification indicates a subscription for PDU session status notification, the DNN Selection Mode indicates a DNN selection mode, the Trace Requirements indicates a tracing requirement, the Control Plane CIoT 5GS Optimisation indication indicates a control plane cell Internet of Things (CIoT) 5GS optimization indication, and the Control Plane Only indicator indicates a control plane only indicator.

It should be noted that in the foregoing exemplary descriptions, the AMF directly transmits an Nsmf_PDUSession_CreateSMContext request message to the SMF, and the Nsmf_PDUSession_CreateSMContext request message carries a plurality of types of information such as the DNN, the S-NSSAI, the Request Type, the Old MBS Multicast/Broadcast Session ID, and the N1 SM Container, but the present disclosure is not limited thereto. In other embodiments, the AMF may directly or indirectly transmit one or more Nsmf_PDUSession_CreateSMContext request messages to the SMF, each Nsmf_PDUSession_CreateSMContext request message carrying at least one of all the foregoing information; or anther message form may be used, which is not limited in the present disclosure, provided that the SMF can finally obtain the foregoing required information.

Step X.1 in FIG. 6 may include the following steps X.1.a to X.1.i.

In step X.1.a, the SMF transmits an Nnrf_NFDiscovery request message (a network function discovery request message, namely, an NF discovery request message) to an NRF, and adds the SUPI and an NF type to the Nnrf_NF-Discovery request message, the NF type being indicated as a UDM to indicate that an ID of a UDM is obtained from the NRF.

In step X.1.b, after the NRF receives the Nnrf_NFDiscovery request message (the SUPI, and the NF type being indicated as a UDM) from the SMF, in response to the Nnrf_NFDiscovery request message (the SUPI, and the NF type being indicated as a UDM), the NRF finds the identity (ID) of the UDM corresponding to the UE, which is referred to as a UE-UDM ID (that is, a user equipment unified data management function identity corresponding to a user equipment unified data management function) herein, and returns an Nnrf_NFDiscovery response message (the UE-UDM ID), namely, an NF discovery response message, to the SMF.

In step X.I.c, after the SMF receives the Nnrf_NFDiscovery response message from the NRF, the SMF may learn of the UDM corresponding to the UE according to the UE-UDM ID carried in the Nnrf_NFDiscovery response message. Therefore, the SMF may transmit a Nudm_SDM_Get request message (a data management get request message) to the UE-UDM corresponding to the UE-UDM ID, the Nudm_SDM_Get request message carrying the UE-UDM ID and the SUPI of the UE.

In step X.1.d, after the UE-UDM receives the Nudm_SDM_Get request message from the SMF, the UE-UDM may transmit a Nudr_DM_Query request message (a data management query request message) to a UE-UDR, the Nudr_DM_Query request message carrying the SUPI of the UE.

It should be noted that in this embodiment of the present disclosure, a UDR corresponding to the UE-UDM is referred to as the UE-UDR, namely, a user equipment unified data repository. In the following descriptions, a UDM corresponding to an MBS session, for example, an MBS multicast/broadcast session is referred to as an MB-UDM, namely, a multicast broadcast unified data management function, and a UDR corresponding to the MB-UDM is referred to as an MB-UDR, namely, a multicast broadcast unified data repository.

In this embodiment of the present disclosure, the MB-UDR and the UE-UDR may be the same UDR or different UDRs.

In step X.1.e, after the UE-UDR receives the Nudr_DM_Query request message from the UE-UDM, the UE-UDR may return an Nudr_DM_Query response message (a data management query response message) to the UE-UDM in response to the Nudr_DM_Query request message, the Nudr_DM_Query response message including MBS session management subscription data of the MBS multicast/broadcast session.

In step X.1.f, after the UE-UDM receives the Nudr_DM_Query response message returned by the UE-UDR, the UE-UDM may return an Nudm_SDM_Get response message (a data management get response message) to the SMF in response to the Nudm_SDM_Get request message, the Nudm_SDM_Get response message carrying the MBS session management subscription data of the MBS multicast/broadcast session.

In step X.I.g, after the SMF receives the Nudm_SDM_Get response message, the SMF may transmit a Nudm_SDM_Subscribe request message (a data management subscription request message) to the UE-UDM, the Nudm_SDM_Subscribe request message carrying the SUPI, the MBS session management subscription data of the MBS multicast/broadcast session, the DNN, and the S-NSSAI.

In step X.1.h, after the UE-UDM receives the Nudm_SDM_Subscribe request message, the UE-UDM may transmit a Nudr_DM_Subscribe message (a data management subscription message) to the UE-UDR, the Nudr_DM_Subscribe message carrying the MBS session management subscription data of the MBS multicast/broadcast session.

In step X.1.i, the UE-UDM may return a Nudm_SDM_Subscribe response message (a data management subscription response message) to the SMF.

In step X.1 in the embodiment of FIG. 6, session management subscription data in Nudm_SDM_Get (including the request and response messages) and Nudm_SDM_Subscribe (including the request and response messages) is indicated as MBS session management subscription data (namely, multicast broadcast service session management subscription data). Likewise, session management subscription data in Nudr_DM_Query (including the request and response messages) and Nudr_DM_Subscribe (including the request and response messages) is indicated as MBS session management subscription data.

In step X.1 in the embodiment of FIG. 6, the SMF queries the NRF by using the SUPI of the UE to obtain the UE-UDM. The UE-UDM in step X.1 in the embodiment of FIG. 6 is configured to store the MBS session management subscription data of the UE. Whether the S-NSSAI and the DNN have subscribed may be learned according to the MBS session management subscription data. If the S-NSSAI and the DNN have not subscribed, the following steps in FIG. 6 are not to be performed. That is, in step X.1, whether establishment of a PDU session is allowed is checked. The MBS session management subscription data includes a lot of information, for example, maximum allowed bandwidth and charging.

It should be noted that if a plurality of MBS multicast/broadcast sessions of the UE are switched to corresponding unicast PDU sessions, the UE performs the entire process of FIG. 6 and FIG. 7 for each PDU session, because S-NSSAI and a DNN of a PDU session corresponding to each MBS multicast/broadcast session are specified in all processes.

In step 3b in FIG. 6, the SMF returns an Nsmf_PDUSession_CreateSMContext response message (namely, a protocol data unit session establishment session management context response message, a PDU session establishment session management context response message for short) to the AMF in response to the Nsmf_PDUSession_CreateSMContext request message.

In step 4 in FIG. 6, PDU session authentication/authorization is performed.

In step 5 in FIG. 6, the SMF selects a UPF, and if the SMF finds that the SMF itself is the MB-SMF, the SMF directly selects the MB-UPF as the UPF.

In step 6a in FIG. 6, the SMF transmits an N4 session establishment request message to the selected UPF.

In step 6b in FIG. 6, the UPF returns an N4 session establishment response message to the SMF for confirmation.

In step 7a in FIG. 7, if a PCF is deployed and a dynamic policy is used, in step 7a in FIG. 7, the SMF selects a PCF (that is, selects a UE-PCF in FIG. 8). The SMF may reuse an MB-PCF selected by the MBS multicast/broadcast session as the UE-PCF, or may re-select a PCF different from the MB-PCF for the UE as the UE-PCF. In this embodiment of the present disclosure, the MB-PCF is preferably selected as the UE-PCF according to the MBS multicast/broadcast session ID.

Step 7b in FIG. 7 is optional. If a PCF is deployed and a dynamic policy is used, in step 7b in FIG. 7, an SM policy association establishment procedure is performed to obtain a default PCC rule of a PDU session.

Step 7c in FIG. 7 is optional. The SMF subscribes to the UE-UDM for the PDU session.

Step X.2 is further added in this embodiment of the present disclosure, and is used for the SMF to discover the MB-SMF, to perform subsequent steps. For details, refer to FIG. 9 and FIG. 10. It should be noted that step X.2 needs to be completed only before step 8, and has no chronological order with other steps.

In step 8 in FIG. 7, the SMF transmits an Nsmf_MBSSession_Create request message, namely, a first MBS session create request message, to the MB-SMF that is found in step X.2 and that corresponds to the MBS session, and the Nsmf_MBSSession_Create Request message may carry the MBS session ID corresponding to the MBS session, namely, an old MBS session ID in FIG. 7.

Further, the Nsmf_MBSSession_Create Request message may further carry an SUPI, a GPSI, a DNN, S-NSSAI, a PDU session ID, an SMF ID, UPF CN-Tunnel-Info (core network tunnel information, CN being short for core network), a PDU session type, a PCF ID, and an AMF ID.

In step 9a in FIG. 7, optionally, the MB-SMF transmits an N4 session establishment request message to the MB-UPF.

In step 9b in FIG. 7, optionally, the MB-UPF returns an N4 session establishment response message to the MB-SMF in response to the N4 session establishment request message. If the SMF provides the UPF CN-Tunnel-Info, the MB-UPF may establish a transmission tunnel to the UPF.

The UPF establishes a user plane connection to the MB-UPF. For example, the UPF joins a transport-layer multicast IP address allocated by the MB-UPF. By using the transport-layer multicast IP address and a common tunnel endpoint identity (TEID) (C-TEID), the UPF starts to receive downlink data transmitted by the MB-UPF. For the UPF, the downlink data is the first downlink data received by the UPF.

In step 10 in FIG. 7, the MB-SMF transmits an Nsmf_MBSSession_Create response message, namely, a first MBS session create response message, to the SMF in response to the Nsmf_MBSSession_Create Request message in step 8. The Nsmf_MBSSession_Create Response message carries an MBS QoS flow parameter list and MBS CN tunnel transmission information of the MB-UPF. The MBS QoS flow parameter list further includes an MBS QoS flow identity (MBS QoS flow ID, MBS QFI), MBS QoS rules, and an MBS QFI QoS profile, that is, all QoS flow information corresponding to the activated MBS session, all the QoS flow information including one or more pieces of information.

It should be noted that because the first MBS session create response message transmitted by the MB-SMF to the SMF includes all the QoS flow information corresponding to the activated MBS session, the SMF may determine that the MBS session has been activated. Therefore, a QoS flow corresponding to the MBS session is established in the PDU session establishment procedure in FIG. 6 and FIG. 7.

Step 11 in FIG. 7 is optional. If a PCF is deployed and a dynamic policy is used, in step 11 in FIG. 7, the SMF triggers an SM policy association modification procedure. The SMF provides, to a selected PCF, QoS information (packet filter, 5QI, ARP, and the like), obtained from the MB-UDM, of QoS flows corresponding to MBS session service flows, to request the PCF to check whether the QoS information of the MBS session service flows conforms to policy rules of the user and the network. The PCF delivers new authorized policy rules, that is, QoS information (packet filter, 5QI, ARP, and the like) of each MBS session service flow, according to the policies of the user and the network. Even if the QoS information is not modified in any manner, the PCF still needs to re-transmit, to the SMF, the QoS information of the MBS session service flows that is provided by the SMF.

If the selected PCF is the MB-PCF, the Npcf_SMPolicyControlCreate Request transmitted by the SMF to the MB-PCF further includes an MBS session ID, and the MBS session ID is indicated as an MBS multicast/broadcast session ID to indicate that the ID is used for an MBS multicast/broadcast session, and corresponds to an ID of the MBS multicast/broadcast session, the MB-PCF may use corresponding authorized policy rules, that is, QoS information (packet filter, 5QI, ARP, and the like) of each MBS session service flow, for the SMF according to the user, the network, and the MBS multicast/broadcast session ID. Even if the QoS information is not modified in any manner, the PCF still needs to re-transmit the QoS information of the MBS session service flows that is provided by the SMF to the SMF.

In step 12 in FIG. 7, the SMF transmits Namf_Communication_N1N2MessageTransfer (namely, a first communication N1N2 message transmission message) to the AMF, and the SMF requests the AMF to transmit a message on an N1 interface and a message on an N2 interface. The SMF expects the AMF to forward SM-related information to the UE and the target NG-RAN. The SMF establishes one or more QoS flows corresponding to the MBS multicast/broadcast session on the PDU session according to QoS information, provided by the PCF, of a dynamic policy rule, or QoS flow information, provided by the MB-UDM, of the MBS multicast/broadcast session.

Specifically, the SMF triggers Namf_Communication_N1N2MessageTransfer ([N2 SM information] (PDU Session ID, QFI(s), QoS Profile(s), [Alternative QoS Profile(s)], Session-AMBR, [CN Tunnel Info(s)], QoS Monitoring indication, QoS Monitoring reporting frequency, [TSCAI(s)]), N1 SM container (PDU Session Modification Command (PDU Session ID, QoS rule(s), QoS Flow level QoS parameters if needed for the QoS Flow(s) associated with the QoS rule(s), QoS rule operation and QoS Flow level QoS parameters operation, Session-AMBR))).

The PDU Session ID in the Namf_Communication_N1N2MessageTransfer is to notify the AMF of a specific session, of the UE, to which a transfer service is provided.

The N2 SM information (N2 session management information) is intended for the target NG-RAN, and main content includes: PDU Session ID, QFI(s), QoS Profile(s), CN Tunnel Info (core network tunnel information), Session-AMBR (session-aggregate maximum bit rate), and PDU Session Type. The QoS Profile(s) is used for the target NG-RAN to configure a plurality of QoS flows of one session. The CN Tunnel Info is used for indicating that the session is on a UPF-side node of an N3 interface.

The N1 SM container (N1 session management container) is intended for the UE, and is an SM message, namely, Session Established Accept, and main content includes: QoS Rule(s), S-NSSAI(s), DNN, IP address, and Session-AMBR. The QoS Rule(s) is used for the UE to configure a plurality of QoS flows of one session. The IP address is used for data routing for the UE after the data exits the UPF.

The QoS Profile(s) and the QoS Rule(s) mentioned herein are a QoS profile and a QoS rule that correspond to each QoS Flow. If there are a plurality of QoS flows, one message includes a QoS profile and a QoS rule that correspond to each QoS flow. In 5G, a plurality of QoS flows of one session are configured at a time in this way, thereby greatly improving signaling efficiency.

In step 13 in FIG. 7, the AMF transmits an N2 PDU session request message to the target NG-RAN.

Specifically, N2 PDU Session Request (N2 SM information, NAS message (PDU Session ID, N1 SM container (PDU Session Establishment Accept)), [CN assisted RAN parameters tuning]). To be specific, the N2 PDU session request transmitted by the AMF to the target NG-RAN includes a NAS message and the N2 SM information received from the SMF, the NAS message including the PDU session ID and the PDU Session Establishment Accept for transmission to the UE.

In step 14 in FIG. 7, radio resource control (RRC) reconfiguration is performed between the target NG-RAN and the UE.

In step 15 in FIG. 7, the target NG-RAN transmits an N2 PDU Session Request ACK message to the AMF.

In step 16 in FIG. 7, the AMF transmits an Nsmf_PDUSession_UpdateSMContext request message to the SMF.

The AMF transmits the Nsmf_PDUSession_UpdateSMContext Request (SM Context ID, N2 SM information, Request Type) to the SMF, and the AMF delivers the N2 SM information to the SMF by using an update SM context service provided by the SMF. There are some parameters related to the QoS Flow(s) in the N2 SM information, and the SMF may update session context content in a timely manner.

In step 17a in FIG. 7, the SMF transmits an N4 session modification request message to the UPF, to transmit AN Tunnel Info (access network tunnel information) that comes from the target NG-RAN, to enable an N3 downlink tunnel and finally notify the UPF of a downlink forwarding rule. There is one parameter in the N2 SM information: AN Tunnel Info. This indicates that the session is on a target-NG-RAN-side node of the N3 interface. After the SMF delivers the AN Tunnel Info to the UPF, a downlink tunnel for the session on the N3 interface is enabled.

In step 17b in FIG. 7, the UPF returns an N4 session modification response message to the SMF in response to the N4 session modification request message.

In step 18 in FIG. 7, the SMF returns an Nsmf_PDUSession_UpdateSMContext response message to the AMF in response to the Nsmf_PDUSession_UpdateSMContext request message.

In step 19 in FIG. 7, the SMF transmits an Nsmf_PDUSession_SMContextStatusNotify message to the AMF.

In step 20 in FIG. 7, the UPF transmits an Internet Protocol Version 6 (IPv6) address configuration to the target NG-RAN, and the target NG-RAN transmits the IPv6 address configuration to the UE. The UPF transmits the first downlink data to the UE.

In step 21 in FIG. 7, the SMF may further transmit an Nsmf_MBSSession_Update request message to the MB-SMF.

In the method for implementing multicast broadcast service handover provided in this embodiment of the present disclosure, on the one hand, when the UE has activated the MBS session with the source base station before the handover and has not established a PDU session associated with the MBS session, after the UE is handed over from the source base station that supports the MBS to the target base station that does not support the MBS, establishment of a PDU session is triggered on the target base station side that does not support the MBS. Because the 5G core network accessed by the target base station supports the MBS, all QoS flows corresponding to the activated MBS session with the source base station side may be directly established on the PDU session associated with the MBS session, thereby simplifying a process of obtaining the QoS flows by the SMF. All the QoS flows corresponding to the activated MBS session may include one or more QoS flows. On the other hand, this method requires a minimum modification to a 5G system, so that the activated MBS session can be handed over to a unicast PDU session when the UE is handed over from the source base station that supports the MBS to the target base station that does not support the MBS.

It should be noted that the foregoing descriptions of the PDU session establishment procedure in FIG. 7 is specific to a case that the MBS session has been activated before the handover. If the MBS session has not been activated before being handed over from the source base station to the target base station, in step 8 in the embodiment of FIG. 7, the SMF transmits an Nsmf_MBSSession_Create request message, namely, a second MBS session create request message, to the MB-SMF corresponding to the MBS session, where the Nsmf_MBSSession_Create Request message may carry the MBS session ID corresponding to the MBS session.

In step 10 in FIG. 7, the MB-SMF transmits an Nsmf_MBSSession_Create response message, namely, a second MBS session create response message, to the SMF in response to the Nsmf_MBSSession_Create Request message in step 8 in FIG. 7. The Nsmf_MBSSession_Create Response message does not carry a list or MBS CN tunnel transmission information of the MB-UPF, that is, the second MBS session create response message does not carry all QoS flow information corresponding to the activated MBS session. Therefore, the SMF can determine that the MBS session has not been activated in this case. Therefore, if the MBS session has not been activated before the handover, no QoS flow corresponding to the MBS session has been established in the PDU session establishment procedure in FIG. 7.

In addition, in step 12 in FIG. 7, the SMF transmits a Namf_Communication_N1N2MessageTransfer (a communication N1N2 message transfer message) to the AMF. Because not all QoS flow information corresponding to the activated MBS session is obtained, in this step, the SMF does not establish, on the PDU session, one or more QoS flows corresponding to the MBS multicast/broadcast session.

When the method in the embodiment shown in FIG. 7 is used, a PDU session has been established on the target RAN or target NG-RAN side, and no QoS flow is established in the embodiment of FIG. 7. In an embodiment of FIG. 8, after UE is successfully handed over from a source base station to a target base station, when an MBS session established on the source base station side accessed before the handover is activated after the handover, an SMF triggers a modification procedure for an established PDU session. When the UE performs the triggered PDU session modification procedure, the SMF obtains all QoS flow information corresponding to the MBS session from an MB-SMF, so that the SMF can establish all QoS flows corresponding to the activated MBS session on the PDU session, to achieve continuity of MBS service data transmission.

FIG. 8 is a schematic diagram of a PDU session modification procedure according to an embodiment of the present disclosure.

In step 1 in FIG. 8, an MBS session is activated after a PDU session is established on a target RAN or target NG-RAN side.

In FIG. 8, step 2a or 2b may be selected to be performed, and in the case of triggering by step 2b, step 3 is performed.

In step 2a in FIG. 8, an MB-PCF transmits an MBS session-related policy control message to an MB-SMF to trigger a MBS session policy association modification.

It should be noted that step 2a may be a part of an MBS session activation procedure in step 1.

In step 2b in FIG. 8, the MB-SMF triggers a QoS update.

In step 3 in FIG. 8, the MB-SMF triggers an SM policy association modification. The MB-SMF obtains a new MBS session policy from the MB-PCF.

If the MB-PCF is deployed and a dynamic policy is used, the MB-SMF triggers an SM policy association modification (SMF initiated SM Policy Association Modification). The MB-SMF provides, to the MB-PCF, QoS information (packet filter, 5QI, ARP, and the like) of QoS flows corresponding to MBS session service flows, to request the MB-PCF to check whether the QoS information of the MBS session service flows conforms to policy rules of a user and a network. The MB-PCF delivers new authorized policy rules, that is, QoS information (packet filter, 5QI, ARP, and the like) of each MBS session service flow, according to the policies of the user and the network. Even if the QoS information is not modified in any manner, the MB-PCF still needs to re-transmit, to the MB-SMF, the QoS information of the MBS session service flows that is provided by the MB-SMF.

In step 4 in FIG. 8, the MB-SMF transmits an Nsmf_MBSSession_Update request message (namely, an MBS session update request message) to an SMF, the MBS session update request message carrying all quality of service flow information corresponding to the activated MBS session.

In step 5a in FIG. 8, the MB-SMF transmits an N4 session modification request to an MB-UPF, and transmits one or more N4 rules corresponding to each QoS flow to the MB-UPF. For each QoS flow, there may be a plurality of N4 rules.

In step 5b in FIG. 8, the MB-UPF transmits an N4 session modification response to the MB-SMF.

In step 6 in FIG. 8, the SMF initiates a session management (SM) policy association modification for the PDU session to a UE-PCF.

If the UE-PCF is deployed and a dynamic policy is used, the SMF triggers an SM policy association modification (SMF initiated SM Policy Association Modification). The SMF provides, to the UE-PCF, the QoS information (packet filter, 5QI, ARP, and the like), provided by the MB-SMF, of the QoS flows corresponding to the MBS session service flows, to request the UE-PCF to check whether the QoS information of the MBS session service flows conforms to the policy rules of the user and the network. The UE-PCF delivers new authorized policy rules, that is, QoS information (packet filter, 5QI, ARP, and the like) of each MBS session service flow, according to the policies of the user and the network. Even if the QoS information is not modified in any manner, the UE-PCF still needs to re-transmit, to the SMF, the QoS information of the MBS session service flows that is provided by the SMF.

In step 7 in FIG. 8, the SMF transmits Namf_Communication_N1N2MessageTransfer (namely, a first communication N1N2 message transmission message) to the AMF, and the SMF requests the AMF to transmit a message on an N1 interface and a message on an N2 interface. The SMF expects the AMF to forward SM-related information to the UE and the target NG-RAN.

Specifically, the SMF triggers Namf_Communication_N1N2MessageTransfer ([N2 SM information] (PDU Session ID, QFI(s), QoS Profile(s), [Alternative QoS Profile(s)], Session-AMBR, [CN Tunnel Info(s)], QoS Monitoring indication, QoS Monitoring reporting frequency, [TSCAI(s)]), N1 SM container (PDU Session Modification Command (PDU Session ID, QoS rule(s), QoS Flow level QoS parameters if needed for the QoS Flow(s) associated with the QoS rule(s), QoS rule operation and QoS Flow level QoS parameters operation, Session-AMBR))).

The PDU Session ID in the Namf_Communication_N1N2MessageTransfer is to notify the AMF of a specific session, of the UE, to which a transfer service is provided.

The N2 SM information (N2 session management information) is intended for the target NG-RAN, and main content includes: PDU Session ID, QFI(s), QoS Profile(s), CN Tunnel Info (core network tunnel information), Session-AMBR (session-aggregate maximum bit rate), and PDU Session Type. The QoS Profile(s) is used for the target NG-RAN to configure a plurality of QoS flows of one session. The CN Tunnel Info is used for indicating that the session is on a UPF-side node of an N3 interface.

The N1 SM container (N1 session management container) is intended for the UE, and is an SM message, namely, Session Established Accept, and main content includes: QoS Rule(s), S-NSSAI(s), DNN, IP address, and Session-AMBR. The QoS Rule(s) is used for the UE to configure a plurality of QoS flows of one session. The IP address is used for data routing for the UE after the data exits the UPF.

The QoS Profile(s) and the QoS Rule(s) mentioned herein are a QoS profile and a QoS rule that correspond to each QoS Flow. If there are a plurality of QoS flows, one message includes a QoS profile and a QoS rule that correspond to each QoS flow. In 5G, a plurality of QoS flows of one session may be configured at a time in this way, thereby greatly improving signaling efficiency. Each QoS flow and its parameter herein respectively correspond to an MBS QoS flow and its parameter corresponding to the MBS session. That is, the SMF maps, to a QoS flow and its parameter of the PDU session, each MBS QoS flow and its parameter that correspond to the MBS session.

In step 8 in FIG. 8, the AMF transmits an N2 session request message to the target RAN, to instruct the target RAN to establish the foregoing QoS flows.

In step 9 in FIG. 8, the UE transmits AN-specific resource modification transfer (including a PDU session modification instruction and a radio-specific resource modification message, for example, an RRC reconfiguration message, to establish data radio bearers (DRBs) for transmitting the QoS flows).

In step 10 in FIG. 8, the target RAN transmits an N2 session response message to the AMF to confirm that radio resources corresponding to the QoS flows have been allocated.

In step 11 in FIG. 8, the AMF transmits an Nsmf_PDUSession_UpdateSMContext request message, namely, a PDU session update session management context request message, to the SMF.

In step 12a in FIG. 8, the SMF transmits an N4 session modification request message to a UPF/PSA.

In step 12b in FIG. 8, the UPF/PSA returns an N4 session modification response message to the SMF in response to the N4 session modification request message.

In step 13 in FIG. 8, the SMF transmits an Nsmf_P-DUSession_UpdateSMContext response message, namely, a PDU session update session management context response message, to the AMF in response to the Nsmf_PDUSession_UpdateSMContext request message.

In step 14 in FIG. 8, the UE transmits a PDU session modification command ACK to the target RAN.

In step 15 in FIG. 8, the target RAN transmits N2 NAS uplink transfer to the AMF.

In step 16 in FIG. 8, the AMF transmits an Nsmf_PDUSession_UpdateSMContext request message to the SMF.

In step 17 in FIG. 8, the SMF transmits an Nsmf_PDUSession_UpdateSMContext response message to the AMF in response to the Nsmf_PDUSession_UpdateSMContext request message.

In step 18 in FIG. 8, the SMF returns an Nsmf_MBSSession_Update response message to the MB-SMF in response to the Nsmf_MBSSession_Update request message in step 4 in FIG. 8.

In step 19a in FIG. 8, the MB-SMF transmits an N4 session modification request message to the MB-UPF.

In step 19b in FIG. 8, the MB-UPF transmits an N4 session modification response to the MB-SMF in response to the N4 session modification request message.

In the method for implementing multicast broadcast service handover provided in this embodiment of the present disclosure, on the one hand, when the UE is handed over from the source base station that supports the MBS to the target base station that does not support the MBS, if the MBS session that has been established on the source base station side has not been activated and the 5G core network accessed by the target base station supports the MBS, after the UE is handed over from the source base station that supports the MBS to the target base station that does not support the MBS, establishment of a PDU session on the target base station side is triggered. Then, after the MBS session is activated, in a procedure of modifying the PDU session, the MB-SMF transmits, to the SMF, the QoS flow information corresponding to the activated MBS session, so that the SMF can establish, on the PDU session associated with the MBS session, the QoS flow corresponding to the activated MBS session, thereby simplifying a process of obtaining the QoS flow information by the SMF. In addition, when the MBS session is established, the MBS session does not need to be associated with a PDU session, thereby saving PDU session resources while maintaining service continuity. On the other hand, this method requires a minimum modification to a 5G system, so that the MBS session can be handed over to a unicast PDU session when the UE is handed over from the source base station that supports the MBS to the target base station that does not support the MBS. In addition, in the solution provided in this embodiment of the present disclosure, even when a transfer plane of the MBS session of the UE is not established, the UE can still be handed over to the target base station that does not support the MBS, and then a unicast PDU session can be established in an asynchronous manner.

In addition, in this embodiment of the present disclosure, because the PDU session associated with the MBS session is established after the UE is handed over to the target base station, when the MBS session is established, the MBS session does not need to be associated with a PDU session, thereby saving PDU session resources while maintaining continuity of the MBS service. In the related art, it is required that an MBS session be associated with a PDU session before UE is handed over, and then the PDU session is handed over to a target cell or a target RAN, and then service data corresponding to the MBS session is transmitted through the PDU session. However, because the UE does not know in advance when the handover is to occur (for example, the handover is triggered by a 5G network), to support the handover that may occur at any time, when an MBS session is activated, a PDU session needs to be established immediately, and before the UE is handed over to the target RAN, the MBS session needs to be associated with the PDU session. This causes waste of a large amount of resources, because the UE may not be handed over to the target base station that does not support the MBS, or is handed over to the target base station that does not support the MBS after a long time, for example, 2 hours.

It should be noted that the method provided in this embodiment of the present disclosure is also applicable to a case that, before UE is handed over from a source base station to a target base station, an MBS session has been established on the source base station side, a PDU session has been established, and the PDU session has been associated with the MBS session before handover.

In this embodiment of the present disclosure, a UDM corresponding to an MBS session, for example, an MBS multicast/broadcast session, is referred to as a multicast broadcast unified data manager (MB-UDM).

Figure 9:
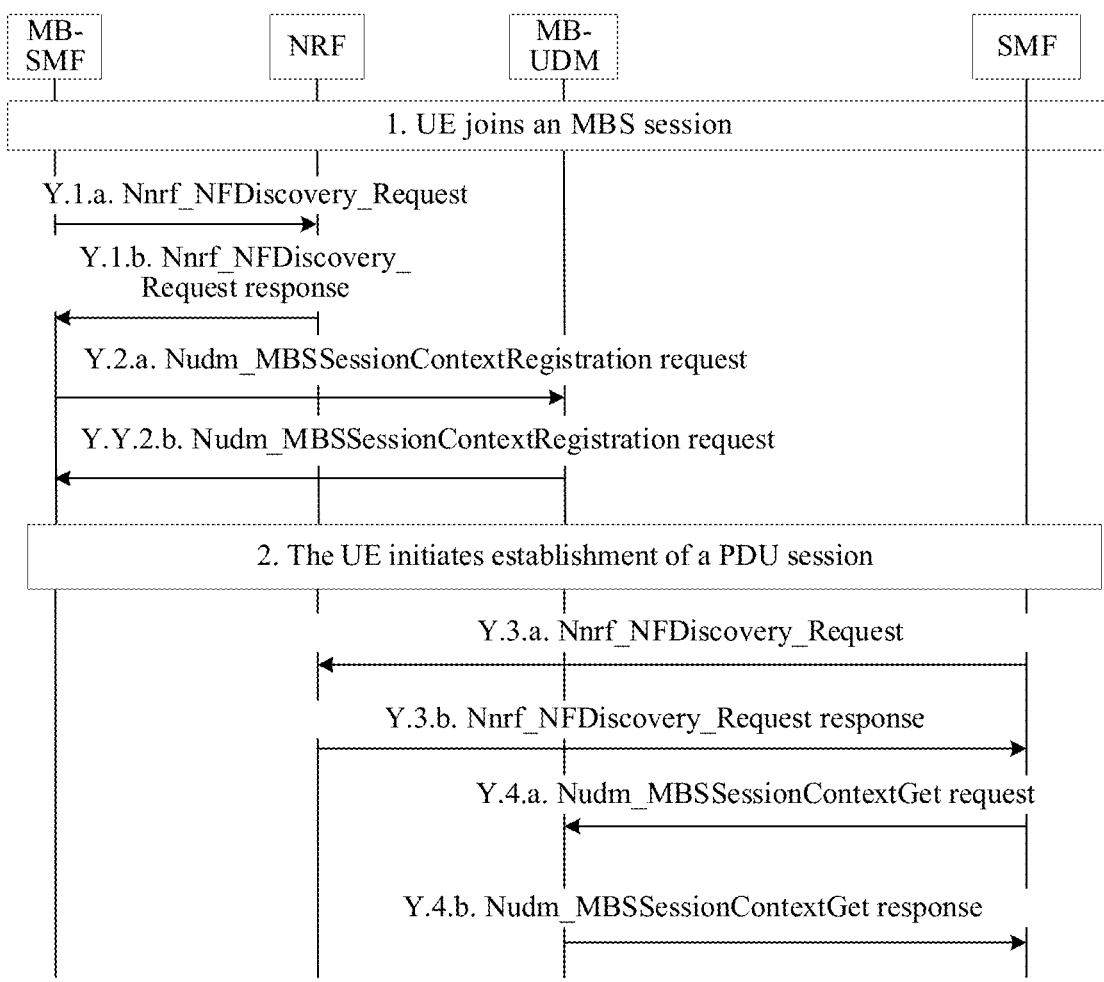
FIG. 9 is a schematic diagram of a procedure of discovering an MB-SMF by an SMF according to an embodiment of the present disclosure.
Figure 10:
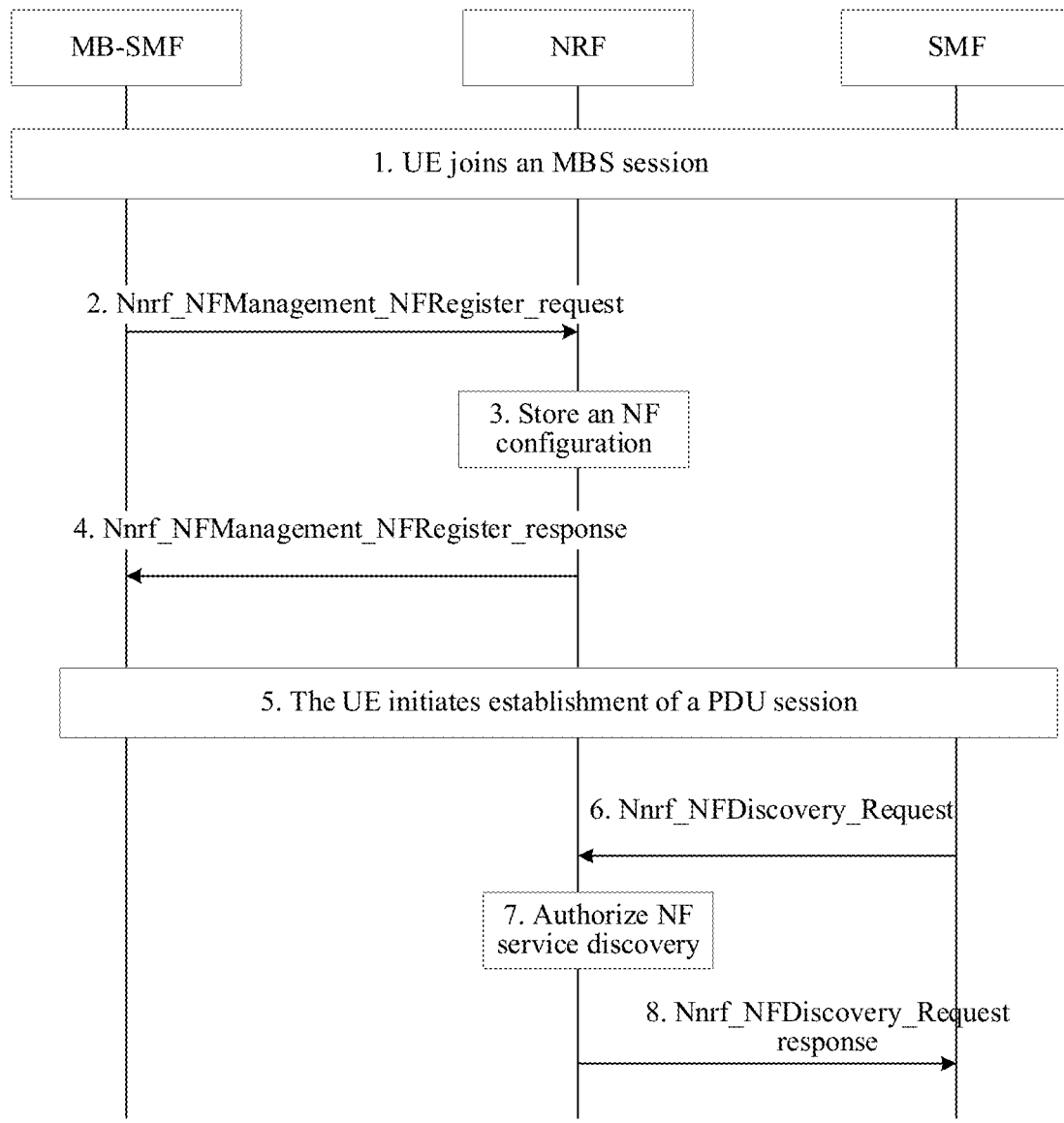
FIG. 10 is a schematic diagram of a procedure of discovering an MB-SMF by an SMF according to another embodiment of the present disclosure.

In the foregoing embodiment, before the SMF transmits the first MBS session create request message or the second MBS session create request message to the MB-SMF, the SMF needs to perform an MB-SMF discovery procedure. FIG. 9 and FIG. 10 provide two different discovery procedures.

FIG. 9 is a schematic diagram of a procedure of discovering an MB-SMF by an SMF according to an embodiment of the present disclosure.

In step 1 in FIG. 9, UE has joined an MBS multicast/broadcast session, the MBS session having been established and having not been activated.

In step Y.1.a in FIG. 9, the MB-SMF transmits an Nnrf_NFDiscovery_Request message (a third NF discovery request message) to an NRF, the Nnrf_NFDiscovery_Request message carrying a MBS session ID indicated as an MBS multicast/broadcast session ID and an NF type indicated as an MBS UDM.

In step Y.1.b in FIG. 9, after receiving the Nnrf_NFDiscovery_Request message, the NRF finds a corresponding MB-UDM ID according to the MBS multicast/broadcast session ID and the NF type indicated as an MBS UDM that are carried in the Nnrf_NFDiscovery_Request message, and returns an Nnrf_NFDiscovery_Request response message (a third NF discovery request response message) to the MB-SMF, the Nnrf_NFDiscovery_Request response message carrying the MB-UDM ID.

In step Y.2.a in FIG. 9, after receiving the Nnrf_NFDiscovery_Request response message, the MB-SMF may transmit an Nudm_MBSSessionContextRegistration request (MBS session context registration request message) to a corresponding MB-UDM according to the MB-UDM ID carried in the Nnrf_NFDiscovery response message, the Nudm_MBSSessionContextRegistration request carrying the MBS session ID (indicated as the MBS multicast/broadcast session ID) and an MB-SMF ID.

It should be noted that there may be a plurality of SMFs. Different SMFs perform different PDU session modification procedures corresponding to the SMFs. A notification correlation ID is intended to notify the SMF of a specific UE whose PDU session corresponds to the SMF.

In step Y.2.b in FIG. 9, after receiving the Nudm_MBSSessionContextRegistration request, the MB- UDM registers the MB-SMF with the MB-UDM, and returns a Nudm_MBSSessionContextRegistration response, namely, an MBS session context registration response message, to the MB-SMF.

It should be noted that because there may be a plurality of MBS sessions handed over to (possibly different) target RANs that do not support the MBS, corresponding MB-SMFs may also be different. Therefore, a plurality of MB-SMFs may be registered with the MB-UDM by using the foregoing steps.

In step 2 in FIG. 9, a PDU session may be established by using the method described in the embodiment of FIG. 6 and FIG. 7.

In step Y.3.a in FIG. 9, the SMF transmits an Nnrf_NFDiscovery_Request message (a first NF discovery request message) to an NRF, the Nnrf_NFDiscovery_Request message carrying a MBS session ID indicated as an MBS multicast/broadcast session ID and an NF type indicated as an MBS UDM.

In step Y.3.b in FIG. 9, after receiving the Nnrf_NFDiscovery_Request message, the NRF finds a corresponding MB-UDM ID according to the MBS multicast/broadcast session ID and the NF type indicated as an MBS UDM that are carried in the Nnrf_NFDiscovery_Request message, and returns an Nnrf_NFDiscovery_Request response message (a first NF discovery request response message) to the MB-SMF, the Nnrf_NFDiscovery_Request response message carrying the MB-UDM ID.

In step Y.4.a in FIG. 9, after receiving the Nnrf_NFDiscovery_Request response message, the SMF may transmit an Nudm_MBSSessionContextGet request (MBS session context get request message) to a corresponding MB-UDM according to the MB-UDM ID carried in the Nnrf_NFDiscovery_Request response message, the Nudm_MBSSessionContextGet request carrying the MBS session ID (indicated as the MBS multicast/broadcast session ID), the notification correlation ID, and the MB-SMF ID.

In step Y.4.b in FIG. 9, after receiving the Nudm_MBSSessionContextGet request message, the MB-UDM returns a Nudm_MBSSessionContextGet response message, namely, an MBS session context get response message, to the SMF, the Nudm_MBSSessionContextGet response message carrying the MBS session ID and the MB-SMF ID.

FIG. 10 is a schematic diagram of a procedure of discovering an MB-SMF by an SMF according to another embodiment of the present disclosure.

In step 1 in FIG. 10, UE has joined an MBS multicast/broadcast session, the MBS session having been established and having not been activated.

In step 2 in FIG. 10, the MB-SMF transmits an Nnrf_NFManagement_NFRegister_request message (NF management NF registration request message) to an NRF, the Nnrf_NFManagement_NFRegister_request message carrying an MBS session ID (indicated as an MBS multicast/broadcast session ID), a notification correlation identity (notification correlation ID), and an MB-SMF ID.

In step 3 in FIG. 10, after receiving the Nnrf_NFManagement_NFRegister_request message, the NRF stores an NF configuration, that is, stores the MBS session ID in association with the MB-SMF ID to the NRF.

In step 4 in FIG. 10, the NRF transmits an Nnrf_NFManagement_NFRegister_response message (NF management NF registration response message) to the MB-SMF in response to the Nnrf_NFManagement_NFRegister_request message.

In step 5 in FIG. 10, a PDU session may be established by using the method described in the embodiment of FIG. 6 and FIG. 7.

In step 6 in FIG. 10, the SMF transmits an Nnrf_NFDiscovery_Request message (a second NF discovery request message) to the NRF, the Nnrf_NFDiscovery_Request message carrying the MBS session ID indicated as an MBS multicast/broadcast session ID and an NF type indicated as an MBS SMF.

In step 7 in FIG. 10, after receiving the Nnrf_NFDiscovery_Request message, the NRF authorizes NF service discovery according to the MBS multicast/broadcast session ID and the NF type that are carried in the Nnrf_NFDiscovery_Request message, indicate to be MBS SMF, and finds an MB-SMF ID that corresponds to the MBS multicast/broadcast session ID and whose NF type is indicated as an MBS SMF.

In step 8 in FIG. 10, the NRF returns an Nnrf_NFDiscovery_Request response message (namely, a second NF discovery request response message) to the SMF, the Nnrf_NFDiscovery_Request response message carrying the MB-SMF ID.

Further, an embodiment of the present disclosure further provides a method for implementing multicast broadcast service handover, applied to an MB-SMF corresponding to user equipment, a source base station accessed by the user equipment before the handover supporting an MBS, the user equipment having established an MBS session with the source base station before the handover, a target base station accessed by the user equipment after the handover not supporting the MBS, and a core network accessed by the target base station supporting the MBS. The method may include: after the user equipment is handed over from the source base station to the target base station, transmitting quality of service flow information corresponding to the activated MBS session to the SMF, the quality of service flow information corresponding to the activated MBS session including one or more pieces of quality of service flow information, so that the SMF establishes, on a PDU session associated with the MBS session according to the quality of service flow information corresponding to the activated MBS session, a quality of service flow corresponding to the activated MBS session, the quality of service flow corresponding to the activated MBS session including one or more quality of service flows; and S-NSSAI of the PDU session being the same as S-NSSAI of the MBS session, and a DNN of the PDU session being the same as a DNN of the MBS session.

In an exemplary embodiment, the user equipment may have activated the MBS session with the source base station before the handover, and have not established the PDU session associated with the MBS session; the transmitting quality of service flow information corresponding to the activated MBS session to the SMF may include: after the user equipment is handed over from the source base station to the target base station, performing a procedure, triggered by the user equipment, of establishing the PDU session on the target base station side; in the procedure of establishing the PDU session on the target base station side, receiving a first MBS session create request message transmitted by the SMF, the first MBS session create request message carrying an MBS session identity of the MBS session; and transmitting, to the SMF, a first MBS session create response message generated in response to the first MBS session create request message, the first MBS session create response message including the quality of service flow information corresponding to the activated MBS session.

In an exemplary embodiment, the user equipment may have not activated the MBS session with the source base station before the handover, and have not established the PDU session associated with the MBS session; before the transmitting quality of service flow information corresponding to the activated MBS session to the SMF, the method may further include: after the user equipment is handed over from the source base station to the target base station, performing a procedure, triggered by the user equipment, of establishing the PDU session on the target base station side; in the procedure of establishing the PDU session on the target base station side, receiving a second MBS session create request message transmitted by the SMF, the second MBS session create request message carrying the MBS session identity; and transmitting, to the SMF, a second MBS session create response message generated in response to the second MBS session create request message, the second MBS session create response message not carrying the quality of service flow information corresponding to the MBS session, so that the SMF determines, according to the second MBS session create response message, that the MBS session has not been activated.

In an exemplary embodiment, the transmitting quality of service flow information corresponding to the activated MBS session to the SMF may include: after the MBS session is activated, triggering a procedure of modifying the PDU session; in the procedure of modifying the PDU session, transmitting an MBS session update request message to the SMF, the MBS session update request message carrying the quality of service flow information corresponding to the activated MBS session; and receive an MBS session update response message returned by the SMF in response to the MBS session update request message.

In an exemplary embodiment, before the user equipment triggers the procedure of establishing the PDU session, the method may further include: transmitting a third NF discovery request message to an NRF, the third NF discovery request message carrying the MBS session identity and a network type indicated as an MBS UDM; receiving a third NF discovery request response message returned by the NRF in response to the third NF discovery request message, the third NF discovery request response message carrying an MB-UDM identity; transmitting an MBS session context registration request message to an MB-UDM according to the MB-UDM identity, the MBS session context registration request message carrying the MBS session identity and an MB-SMF identity of the MB-SMF corresponding to the MBS session identity, to store the MBS session identity in association with the MB-SMF identity to the MB-UDM; and receiving an MBS session context registration response message returned by the MB-UDM in response to the MBS session context registration request message.

In an exemplary embodiment, before the user equipment triggers the procedure of establishing the PDU session, the method may further include: transmitting an NF management NF registration request message to the NRF, the NF management NF registration request message carrying the MBS session identity and an MB-SMF identity of the MB-SMF corresponding to the MBS session identity, to store the MBS session identity in association with the MB-SMF identity to the NRF; and receiving an NF management NF registration response message returned by the NRF in response to the NF management NF registration request message, the NF management NF registration response message carrying the MB-SMF identity of the MB-SMF.

For specific implementations of the method for implementing multicast broadcast service handover provided in this embodiment of the present disclosure, refer to the content of the method for implementing multicast broadcast service handover in the foregoing other embodiments. Details are not described herein again.

Figure 11:
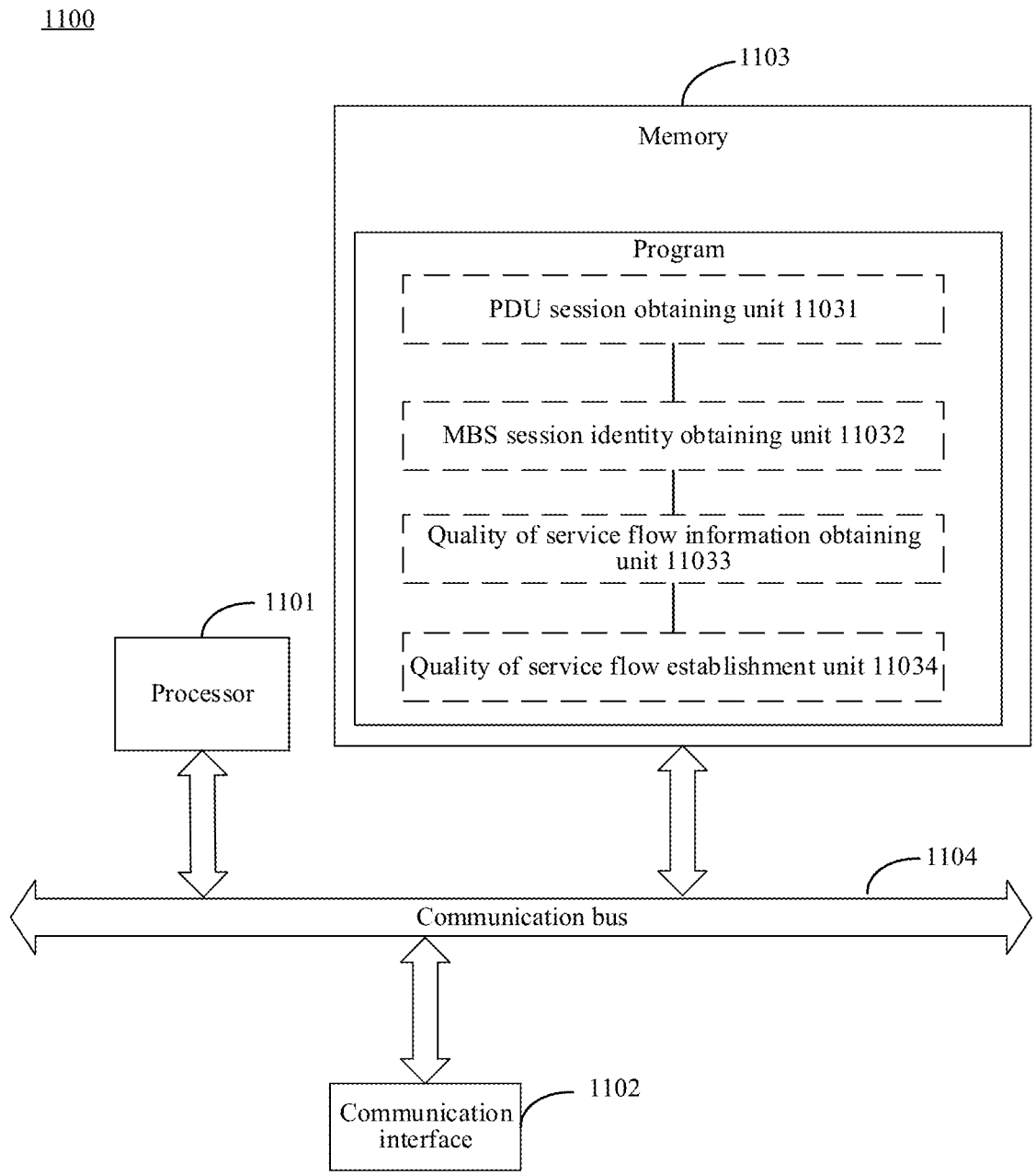
FIG. 11 is a schematic block diagram of a session management function device according to an embodiment of the present disclosure.

FIG. 11 is a schematic block diagram of a session management function device according to an embodiment of the present disclosure. As shown in FIG. 11, the session management function device 1100 provided in this embodiment of the present disclosure may include: one or more processors (1101); a storage apparatus 1103, configured to store one or more programs, the one or more programs, when executed by the one or more processors 1101, causing the one or more processors 1101 to implement the method according to any of the foregoing embodiments. In the embodiment of FIG. 11, a source base station accessed by user equipment before handover supports an MBS, the user equipment has established an MBS session with the source base station before the handover, a target base station accessed by the user equipment after the handover does not support the MBS, and a core network accessed by the target base station supports the MBS.

The program may be specifically configured to: obtain a PDU session associated with the MBS session, S-NSSAI of the PDU session being the same as S-NSSAI of the MBS session, and a DNN of the PDU session being the same as a DNN of the MBS session; obtain an MBS session identity of the MBS session; obtain, from an MB-SMF according to the MBS session identity, quality of service flow information corresponding to the activated MBS session, the quality of service flow information corresponding to the activated MBS session including one or more pieces of quality of service flow information; and establish, on the PDU session according to the quality of service flow information corresponding to the activated MBS session, a quality of service flow corresponding to the activated MBS session, the quality of service flow corresponding to the activated MBS session including one or more quality of service flows.

With reference to FIG. 11, the program may further include: a PDU session obtaining unit 11031, which may be configured to obtain the PDU session associated with the MBS session, the S-NSSAI of the PDU session being the same as the S-NSSAI of the MBS session, and the DNN of the PDU session being the same as the DNN of the MBS session; an MBS session identity obtaining unit 11032, which may be configured to obtain the MBS session identity of the MBS session; an quality of service flow information obtaining unit 11033, which may be configured to obtain, from the MB-SMF according to the MBS session identity, the quality of service flow information corresponding to the activated MBS session, the quality of service flow information corresponding to the activated MBS session including one or more pieces of quality of service flow information; and a quality of service flow establishment unit 11034, which may be configured to establish, on the PDU session according to the quality of service flow information corresponding to the activated MBS session, the quality of service flow corresponding to the activated MBS session, the quality of service flow corresponding to the activated MBS session including one or more quality of service flows.

In an exemplary embodiment, the user equipment has activated the MBS session with the source base station before the handover, and has not established the PDU session associated with the MBS session; the PDU session obtaining unit 11031 may be configured to: after the user equipment is handed over from the source base station to the target base station, perform a procedure, triggered by the user equipment, of establishing the PDU session on the target base station side; and the MBS session identity obtaining unit 11032 may be configured to: in the procedure of establishing the PDU session on the target base station side, receive a PDU session establishment session management context request message from an AMF, the PDU session establishment session management context request message including the MBS session identity.

In an exemplary embodiment, the PDU session establishment session management context request message further includes the S-NSSAI, the DNN, a request type, and an N1 session management container, where the request type is indicated as Existing MBS Session, and the N1 session management container includes a PDU session establishment request.

In an exemplary embodiment, the quality of service flow information obtaining unit 11033 may be configured to: in the procedure of establishing the PDU session on the target base station side, transmit a first MBS session create request message to the MB-SMF, the first MBS session create request message carrying the MBS session identity; and receive a first MBS session create response message returned by the MB-SMF in response to the first MBS session create request message, the first MBS session create response message including the quality of service flow information corresponding to the activated MBS session.

In an exemplary embodiment, the quality of service flow establishment unit 11034 may be configured to: in the procedure of establishing the PDU session, transmitting a first communication N1N2 message transmission message to the AMF, so that the AMF establishes, on the DPU session according to the quality of service flow information corresponding to the activated MBS session, the quality of service flow corresponding to the MBS session.

In an exemplary embodiment, the user equipment has not activated the MBS session with the source base station before the handover, and has not established the PDU session associated with the MBS session; and the program may further include: a second MBS session create request message transmitting unit, which may be configured to: before the quality of service flow information corresponding to the activated MBS session is obtained from the MB-SMF according to the MBS session identity, in a procedure of establishing the PDU session on the target base station side after the handover, transmit a second MBS session create request message to the MB-SMF, the second MBS session create request message carrying the MBS session identity; a second MBS session create response message receiving unit, which may be configured to receive a second MBS session create response message returned by the MB-SMF in response to the second MBS session create request message; and an MBS session non-activation determining unit, which may be configured to: when the second MBS session create response message does not carry the quality of service flow information corresponding to the MBS session, determine that the MBS session has not been activated.

In an exemplary embodiment, the quality of service flow information obtaining unit 11033 may be configured to: after the MBS session is activated, perform a procedure, triggered by the MB-SMF, of modifying the PDU session; and in the procedure of modifying the PDU session, receive an MBS session update request message transmitted by the MB-SMF, the MBS session update request message carrying the quality of service flow information corresponding to the activated MBS session; and return, to the MB-SMF, an MBS session update response message that responds to the MBS session update request message.

In an exemplary embodiment, the quality of service flow establishment unit 11034 may be configured to: in the procedure of modifying the PDU session, transmit a second communication N1N2 message transmission message to the AMF, so that the AMF establishes, on the DPU session according to the quality of service flow information corresponding to the activated MBS session, the quality of service flow corresponding to the MBS session.

In an exemplary embodiment, the program may further include: a UE-UDM determining unit, which may be configured to: before the quality of service flow information corresponding to the activated MBS session is obtained from the MB-SMF according to the MBS session identity, in the procedure of establishing the PDU session, determine a UE-UDM according to an SUPI of the user equipment; an MBS session management subscription data obtaining unit, which may be configured to obtain MBS session management subscription data of the MBS session from the UE-UDM according to the SUPI; and a subscription determining unit, which may be configured to determine, according to the MBS session management subscription data, that the S-NSSAI and the DNN have subscribed on the UE-UDM.

In an exemplary embodiment, the program may further include: a first NF discovery request message transmitting unit, which may be configured to: after the it is determined, according to the MBS session management subscription data, that the S-NSSAI and the DNN have subscribed on the UE-UDM, transmit a first NF discovery request message to an NRF, the first NF discovery request message carrying the MBS session identity and a network type indicated as an MBS UDM; a first NF discovery request response message receiving unit, which may be configured to receive a first NF discovery request response message returned by the NRF in response to the first NF discovery request message, the first NF discovery request response message carrying an MB-UDM identity; an MBS session context get request message transmitting unit, which may be configured to transmit an MBS session context get request message to an MB-UDM according to the MB-UDM identity, the MBS session context get request message carrying the MBS session identity; and an MBS session context get response message receiving unit, which may be configured to receive an MBS session context get response message returned by the MB-UDM in response to the MBS session context get request message, the MBS session context get response message carrying an MB-SMF identity of the MB-SMF corresponding to the MBS session identity.

In an exemplary embodiment, the program may further include: a second NF discovery request message transmitting unit, which may be configured to: after the it is determined, according to the MBS session management subscription data that the S-NSSAI and the DNN have subscribed on the UE-UDM, transmit a second NF discovery request message to an NRF, the second NF discovery request message carrying the MBS session identity and a network type indicated as an MBS SMF; and a second NF discovery request response message receiving unit, which may be configured to receive a second NF discovery request response message returned by the NRF in response to the second NF discovery request message, the second NF discovery request response message carrying an MB-SMF identity of the MB-SMF corresponding to the MBS session identity.

For specific implementations of the session management function device provided in this embodiment of the present disclosure, refer to the content in the foregoing method for implementing multicast broadcast service handover. Details are not described herein again.

Figure 12:
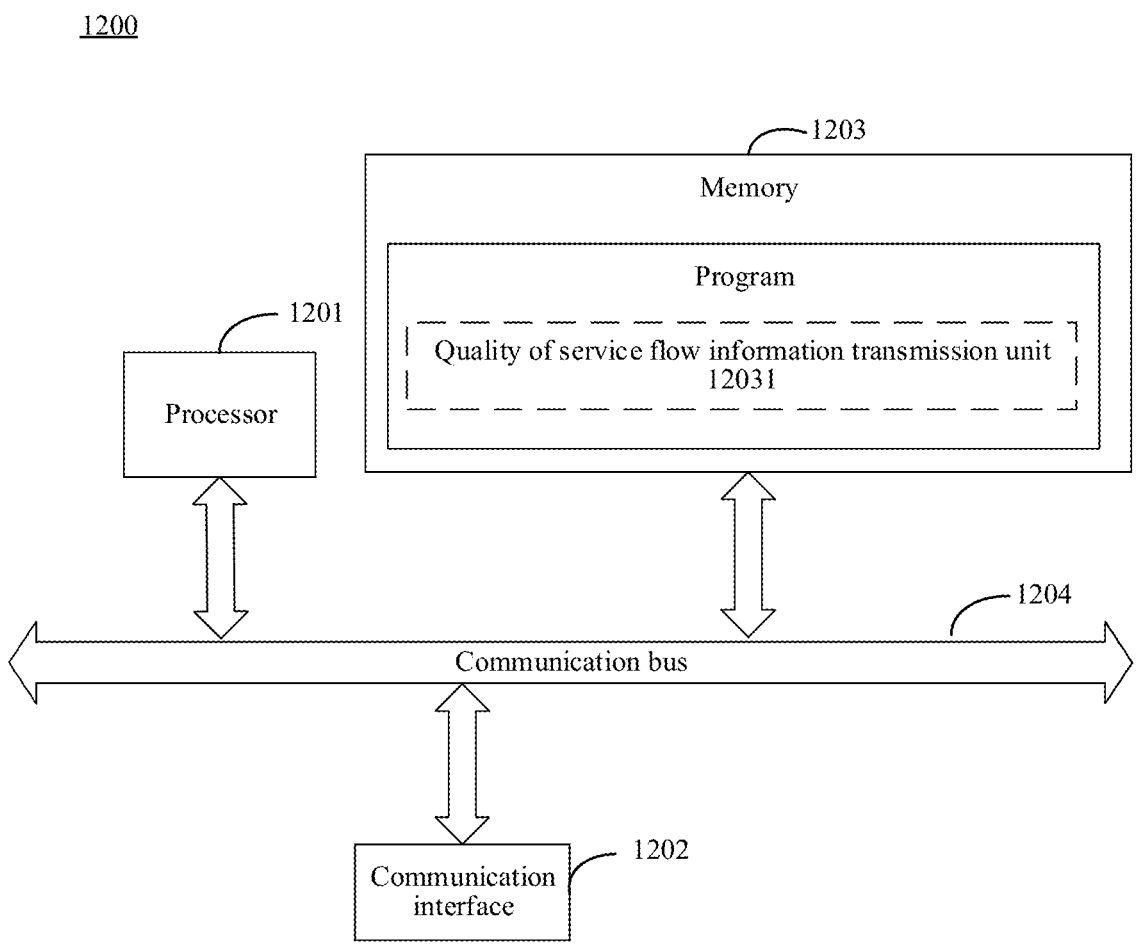
FIG. 12 is a schematic block diagram of a multicast broadcast session management function device according to an embodiment of the present disclosure.

FIG. 12 is a schematic block diagram of a multicast broadcast session management function device according to an embodiment of the present disclosure. As shown in FIG. 12, the multicast broadcast session management function device 1200 provided in this embodiment of the present disclosure may include: one or more processors (1201); a storage apparatus 1203, configured to store one or more programs, the one or more programs, when executed by the one or more processors 1201, causing the one or more processors 1201 to implement the method according to any of the foregoing embodiments. In the embodiment of FIG. 12, a source base station accessed by user equipment before handover supports an MBS, the user equipment has established an MBS session with the source base station before the handover, a target base station accessed by the user equipment after the handover does not support the MBS, and a core network accessed by the target base station supports the MBS.

The program may be specifically configured to: after the user equipment is handed over from the source base station to the target base station, transmit quality of service flow information corresponding to the activated MBS session to the SMF, the quality of service flow information corresponding to the activated MBS session including one or more pieces of quality of service flow information, so that the SMF establishes, on a PDU session associated with the MBS session according to the quality of service flow information corresponding to the activated MBS session, a quality of service flow corresponding to the activated MBS session, the quality of service flow corresponding to the activated MBS session including one or more quality of service flows; and S-NSSAI of the PDU session being the same as S-NSSAI of the MBS session, and a DNN of the PDU session being the same as a DNN of the MBS session.

With reference to FIG. 12, the program may further include: a quality of service flow information transmitting unit 12031, which may be configured to: after the user equipment is handed over from the source base station to the target base station, transmit quality of service flow information corresponding to the activated MBS session to the SMF, the quality of service flow information including one or more pieces of quality of service flow information, so that the SMF establishes, on a PDU session associated with the MBS session according to the quality of service flow information corresponding to the activated MBS session, a quality of service flow corresponding to the activated MBS session, the quality of service flow corresponding to the activated MBS session including one or more quality of service flows.

In an exemplary embodiment, the user equipment has activated the MBS session with the source base station before the handover, and has not established the PDU session associated with the MBS session; The quality of service flow information transmitting unit 12031 may be configured to: after the user equipment is handed over from the source base station to the target base station, perform a procedure, triggered by the user equipment, of establishing the PDU session on the target base station side; in the procedure of establishing the PDU session on the target base station side, receive a first MBS session create request message transmitted by the SMF, the first MBS session create request message carrying an MBS session identity of the MBS session; and transmit, to the SMF, a first MBS session create response message generated in response to the first MBS session create request message, the first MBS session create response message including the quality of service flow information corresponding to the activated MBS session.

In an exemplary embodiment, the user equipment has not activated the MBS session with the source base station before the handover, and has not established the PDU session associated with the MBS session; and the program may further include: a PDU session establishment execution procedure, which may be configured to: before the quality of service flow information corresponding to the activated MBS session is transmitted to the SMF, and after the user equipment is handed over from the source base station to the target base station, perform a procedure, triggered by the user equipment, of establishing the PDU session on the target base station side; a second MBS session create request message receiving unit, which may be configured to: in the procedure of establishing the PDU session on the target base station side, receive a second MBS session create request message transmitted by the SMF, the second MBS session create request message carrying the MBS session identity; and a second MBS session create response message transmitting unit, which may be configured to transmit, to the SMF, a second MBS session create response message generated in response to the second MBS session create request message, the second MBS session create response message not carrying the quality of service flow information corresponding to the MBS session, so that the SMF determines, according to the second MBS session create response message, that the MBS session has not been activated.

In an exemplary embodiment, the quality of service flow information transmitting unit 12031 may be configured to: after the MBS session is activated, trigger a procedure of modifying the PDU session; in the procedure of modifying the PDU session, transmit an MBS session update request message to the SMF, the MBS session update request message carrying the quality of service flow information corresponding to the activated MBS session; and receive an MBS session update response message returned by the SMF in response to the MBS session update request message.

In an exemplary embodiment, the program may further include: a third NF discovery request message transmitting unit, which may be configured to: before the user equipment triggers the procedure of establishing the PDU session, transmit a third NF discovery request message to an NRF, the third NF discovery request message carrying the MBS session identity and a network type indicated as an MBS UDM; a third NF discovery request response message receiving unit, which may be configured to receive a third NF discovery request response message returned by the NRF in response to the third NF discovery request message, the third NF discovery request response message carrying an MB-UDM identity; an MBS session context registration request message transmitting unit, which may be configured to: transmit an MBS session context registration request message to an MB-UDM according to the MB-UDM identity, the MBS session context registration request message carrying the MBS session identity and an MB-SMF identity of the MB-SMF corresponding to the MBS session identity, to store the MBS session identity in association with the MB-SMF identity to the MB-UDM; and an MBS session context registration response message receiving unit, which may be configured to: receive an MBS session context registration response message returned by the MB-UDM in response to the MBS session context registration request message.

In an exemplary embodiment, the program may further include: an NF management NF registration request message transmitting unit, which may be configured to: before the user equipment triggers the procedure of establishing the PDU session, transmit an NF management NF registration request message to the NRF, the NF management NF registration request message carrying the MBS session identity and an MB-SMF identity of the MB-SMF corresponding to the MBS session identity, to store the MBS session identity in association with the MB-SMF identity to the NRF; and an NF management NF registration response message receiving unit, which may be configured to receive an NF management NF registration response message returned by the NRF in response to the NF management NF registration request message, the NF management NF registration response message carrying the MB-SMF identity of the MB-SMF.

For specific implementations of the multicast broadcast session management function device provided in this embodiment of the present disclosure, refer to the content in the foregoing method for implementing multicast broadcast service handover. Details are not described herein again.

It should be noted that FIG. 11 and FIG. 12 show schematic structural diagrams of the session management function device 1100 and the multicast broadcast session management function device 1200 that are suitable for implementing the embodiments of this application. The structure shown in FIG. 11 and FIG. 12 is merely an example, and should not impose any limitation on a function and use scope of the embodiments of this application.

Referring to FIG. 11 and FIG. 12, the session management function device 1100 and the multicast broadcast session management function device 1200 provided in embodiments of the present disclosure may further include: a communication interface (1102, 1202) and a communication bus (1104, 1204).

The processor (1101, 1201), the communication interface (1102, 1202), and the memory (1103, 1203) perform mutual communication by using the communication bus (1104, 1204).

In some embodiments, the communication interface (1102, 1202) may be the interface of the communication module, such as the interface of GSM (Global System for Mobile Communications) module. The processor (1101, 1201) is configured to execute a program. The memory (1103, 1203) is configured to store a program. The program may include a computer program, and the computer program includes a computer operating instruction.

The processor (1101, 1201) may be a central processing unit (CPU) or an application specific integrated circuit (ASIC) or may be configured as one or more integrated circuits for implementing the embodiments of the present disclosure.

The memory (1103, 1203) may include a high-speed RAM (random access memory), and may further include a non-volatile memory such as at least one magnetic disk storage device.

A non-transitory computer-readable storage medium, stories a computer program, the computer program, when executed by a processor, implementing the method according to any of the foregoing embodiments.

Particularly, according to an embodiment of the present disclosure, the processes described in the following by referring to the flowcharts may be implemented as computer software programs. For example, an embodiment of the present disclosure includes a computer program product, including a computer program carried on a computer-readable storage medium. The computer program includes a program code for performing the method shown in the flowchart.

It should be noted that the computer-readable storage medium shown in this disclosure may be a computer-readable signal medium or a computer-readable storage medium or any combination of the two.

In another aspect, this application further provides a computer-readable storage medium. The computer-readable storage medium may be included in the electronic device described in the foregoing embodiments, or may exist alone without being assembled into the electronic device. The computer-readable storage medium carries one or more programs, the one or more programs, when executed by the electronic device, causing the electronic device to implement the method described in the following embodiments.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for implementing a multicast broadcast service (MBS) handover performed by a computer device acting as user equipment, a source base station accessed by the user equipment before the handover supporting an MBS, the user equipment having activated an MBS session with the source base station before the handover, a target base station accessed by the user equipment after the handover not supporting the MBS, a core network accessed by the target base station supporting the MBS, and the method comprising: initiating an establishment procedure to establish a protocol data unit (PDU) session on the target base station side by transmitting a non-access stratum NAS message to an access and mobility management function AMF after the user equipment is handed over from the source base station to the target base station, the NAS message including single-network slice selection assistance information (S-NSSAI) and a data network name (DNN) of the MBS session used for establishing the PDU session associated with the MBS session; obtaining the PDU session associated with the MBS session, S-NSSAI of the PDU session being the same as S-NSSAI of the MBS session, and a DNN of the PDU session being the same as a DNN of the MBS session; obtaining an MBS session identity of the MBS session from a PDU session establishment session management context request message returned by the AMF, the PDU session establishment session management context request message comprising the MBS session identity; obtaining, from an multicast/broadcast session management function (MB-SMF) according to the MBS session identity, quality of service flow information corresponding to the activated MBS session, the quality of service flow information corresponding to the activated MBS session comprising one or more pieces of quality of service flow information; and establishing, according to the quality of service flow information corresponding to the activated MBS session, a quality of service flow corresponding to the activated MBS session on the PDU session, the quality of service flow corresponding to the activated MBS session comprising one or more quality of service flows.

2. The method according to claim 1, wherein the PDU session establishment session management context request message further comprises the S-NSSAI, the DNN, a request type, and an N1 session management container, wherein the request type is indicated as Existing MBS Session, and the N1 session management container carries a PDU session establishment request.

3. The method according to claim 1, wherein the obtaining, from an MB-SMF according to the MBS session identity, quality of service flow information corresponding to the activated MBS session comprises:
    transmitting a first MBS session create request message to the MB-SMF, the first MBS session create request message carrying the MBS session identity; and
    receiving a first MBS session create response message returned by the MB-SMF in response to the first MBS session create request message, the first MBS session create response message comprising the quality of service flow information corresponding to the activated MBS session.

4. The method according to claim 1, wherein before the obtaining, from an MB-SMF according to MBS session identity, quality of service flow information corresponding to the activated MBS session, the method further comprises:
    determining a user equipment-unified data management UE-UDM according to a subscription permanent identifier SUPI of the user equipment;
    obtaining MBS session management subscription data of the MBS session from the UE-UDM according to the SUPI; and
    determining, according to the MBS session management subscription data, that the S-NSSAI and the DNN have subscribed on the UE-UDM.

5. The method according to claim 1, wherein the user equipment has not activated the MBS session with the source base station before the handover, and has not established the PDU session associated with the MBS session; and before the obtaining, from an MB-SMF according to the MBS session identity, quality of service flow information corresponding to the activated MBS session, the method further comprises:
    transmitting a second MBS session create request message to the MB-SMF, the second MBS session create request message carrying the MBS session identity;
    receiving a second MBS session create response message returned by the MB-SMF in response to the second MBS session create request message; and
    when the second MBS session create response message does not carry the quality of service flow information corresponding to the MBS session, determining that the MBS session has not been activated.

6. The method according to claim 5, wherein the obtaining, from an MB-SMF according to the MBS session identity, quality of service flow information corresponding to the activated MBS session comprises:
    after the MBS session is activated:
    receiving an MBS session update request message transmitted by the MB-SMF, the MBS session update request message carrying the quality of service flow information corresponding to the activated MBS session; and
    returning, to the MB-SMF, an MBS session update response message that responds to the MBS session update request message.

7. A computer device acting as user equipment, comprising: one or more processors; and a storage apparatus, configured to store one or more programs, the one or more programs, when executed by the one or more processors, causing the user equipment to implement a method for implementing a multicast broadcast service (MBS) handover, a source base station accessed by the user equipment before the handover supporting an MBS, the user equipment having activated an MBS session with the source base station before the handover, a target base station accessed by the user equipment after the handover not supporting the MBS, a core network accessed by the target base station supporting the MBS, and the method comprising: initiating an establishment procedure to establish a protocol data unit (PDU) session on the target base station side by transmitting a non-access stratum NAS message to an access and mobility management function AMF after the user equipment is handed over from the source base station to the target base station, the NAS message including single-network slice selection assistance information (S-NSSAI) and a data network name (DNN) of the MBS session used for establishing the PDU session associated with the MBS session; obtaining the PDU session associated with the MBS session, S-NSSAI of the PDU session being the same as S-NSSAI of the MBS session, and a DNN of the PDU session being the same as a DNN of the MBS session; obtaining an MBS session identity of the MBS session from a PDU session establishment session management context request message returned by the AMF, the PDU session establishment session management context request message comprising the MBS session identity; obtaining, from an multicast/broadcast session management function (MB-SMF) according to the MBS session identity, quality of service flow information corresponding to the activated MBS session, the quality of service flow information corresponding to the activated MBS session comprising one or more pieces of quality of service flow information; and establishing, according to the quality of service flow information corresponding to the activated MBS session, a quality of service flow corresponding to the activated MBS session on the PDU session, the quality of service flow corresponding to the activated MBS session comprising one or more quality of service flows.

8. The computer device according to claim 7, wherein the PDU session establishment session management context request message further comprises the S-NSSAI, the DNN, a request type, and an N1 session management container, wherein the request type is indicated as Existing MBS Session, and the N1 session management container carries a PDU session establishment request.

9. The computer device according to claim 7, wherein the obtaining, from an MB-SMF according to the MBS session identity, quality of service flow information corresponding to the activated MBS session comprises:
    transmitting a first MBS session create request message to the MB-SMF, the first MBS session create request message carrying the MBS session identity; and
    receiving a first MBS session create response message returned by the MB-SMF in response to the first MBS session create request message, the first MBS session create response message comprising the quality of service flow information corresponding to the activated MBS session.

10. The computer device according to claim 7, wherein before the obtaining, from an MB-SMF according to MBS session identity, quality of service flow information corresponding to the activated MBS session, the method further comprises:

determining a user equipment-unified data management UE-UDM according to a subscription permanent identifier SUPI of the user equipment;

obtaining MBS session management subscription data of the MBS session from the UE-UDM according to the SUPI; and determining, according to the MBS session management subscription data, that the S-NSSAI and the DNN have subscribed on the UE-UDM.

11. The computer device according to claim 7, wherein the user equipment has not activated the MBS session with the source base station before the handover, and has not established the PDU session associated with the MBS session; and before the obtaining, from an MB-SMF according to the MBS session identity, quality of service flow information corresponding to the activated MBS session, the method further comprises:

transmitting a second MBS session create request message to the MB-SMF, the second MBS session create request message carrying the MBS session identity;

receiving a second MBS session create response message returned by the MB-SMF in response to the second MBS session create request message; and when the second MBS session create response message does not carry the quality of service flow information corresponding to the MBS session, determining that the MBS session has not been activated.

12. The computer device according to claim 11, wherein the obtaining, from an MB-SMF according to the MBS session identity, quality of service flow information corresponding to the activated MBS session comprises:

after the MBS session is activated:

receiving an MBS session update request message transmitted by the MB-SMF, the MBS session update request message carrying the quality of service flow information corresponding to the activated MBS session; and returning, to the MB-SMF, an MBS session update response message that responds to the MBS session update request message.

13. A non-transitory computer-readable storage medium, storing a computer program, the computer program, when executed by a processor of a computer device acting as user equipment, causing the user equipment to implement a method for implementing a multicast broadcast service (MBS) handover, a source base station accessed by the user equipment before the handover supporting an MBS, the user equipment having activated an MBS session with the source base station before the handover, a target base station accessed by the user equipment after the handover not supporting the MBS, a core network accessed by the target base station supporting the MBS, and the method comprising:

initiating an establishment procedure to establish a protocol data unit (PDU) session on the target base station side by transmitting a non-access stratum NAS message to an access and mobility management function AMF after the user equipment is handed over from the source base station to the target base station, the NAS message including single-network slice selection assistance information (S-NSSAI) S-NSSAI and a data network name (DNN) of the MBS session used for establishing the PDU session associated with the MBS session; obtaining the PDU session associated with the MBS session, S-NSSAI of the PDU session being the same as S-NSSAI of the MBS session, and a DNN of the PDU session being the same as a DNN of the MBS session; obtaining an MBS session identity of the MBS session from a PDU session establishment session management context request message returned by the AMF, the PDU session establishment session management context request message comprising the MBS session identity; obtaining, from an multicast/broadcast session management function (MB-SMF) according to the MBS session identity, quality of service flow information corresponding to the activated MBS session, the quality of service flow information corresponding to the activated MBS session comprising one or more pieces of quality of service flow information; and establishing, according to the quality of service flow information corresponding to the activated MBS session, a quality of service flow corresponding to the activated MBS session on the PDU session, the quality of service flow corresponding to the activated MBS session comprising one or more quality of service flows.

14. The non-transitory computer-readable storage medium according to claim 5, wherein the PDU session establishment session management context request message further comprises the S-NSSAI, the DNN, a request type, and an N1 session management container, wherein the request type is indicated as Existing MBS Session, and the N1 session management container carries a PDU session establishment request.

15. The non-transitory computer-readable storage medium according to claim 13, wherein the obtaining, from an MB-SMF according to the MBS session identity, quality of service flow information corresponding to the activated MBS session comprises:

transmitting a first MBS session create request message to the MB-SMF, the first MBS session create request message carrying the MBS session identity; and receiving a first MBS session create response message returned by the MB-SMF in response to the first MBS session create request message, the first MBS session create response message comprising the quality of service flow information corresponding to the activated MBS session.

16. The non-transitory computer-readable storage medium according to claim 13, wherein the user equipment has not activated the MBS session with the source base station before the handover, and has not established the PDU session associated with the MBS session; and before the obtaining, from an MB-SMF according to the MBS session identity, quality of service flow information corresponding to the activated MBS session, the method further comprises:

transmitting a second MBS session create request message to the MB-SMF, the second MBS session create request message carrying the MBS session identity;

receiving a second MBS session create response message returned by the MB-SMF in response to the second MBS session create request message; and when the second MBS session create response message does not carry the quality of service flow information corresponding to the MBS session, determining that the MBS session has not been activated.

17. The non-transitory computer-readable storage medium according to claim 13, wherein before the obtaining, from an MB-SMF according to MBS session identity, quality of service flow information corresponding to the activated MBS session, the method further comprises:

determining a user equipment-unified data management UE-UDM according to a subscription permanent identifier SUPI of the user equipment;

obtaining MBS session management subscription data of the MBS session from the UE-UDM according to the SUPI; and determining, according to the MBS session management subscription data, that the S-NSSAI and the DNN have subscribed on the UE-UDM.

* * * * *